US011449571B2

(12) United States Patent
Rehn

(10) Patent No.: US 11,449,571 B2
(45) Date of Patent: Sep. 20, 2022

(54) SYSTEMS AND METHODS FOR GENERATING DYNAMIC WEBSITES WITH HYPERMEDIA ELEMENTS

(71) Applicant: Coupang Corp., Seoul (KR)

(72) Inventor: Erik Rehn, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/932,086

(22) Filed: Jul. 17, 2020

(65) Prior Publication Data

US 2021/0209181 A1 Jul. 8, 2021

Related U.S. Application Data

(63) Continuation of application No. 16/732,812, filed on Jan. 2, 2020, now Pat. No. 10,754,916.

(51) Int. Cl.
*G06F 16/958* (2019.01)
*G06Q 30/06* (2012.01)
(Continued)

(52) U.S. Cl.
CPC ........ *G06F 16/958* (2019.01); *G06F 16/9535* (2019.01); *G06Q 10/087* (2013.01); *G06Q 10/0833* (2013.01); *G06Q 30/0641* (2013.01)

(58) Field of Classification Search
CPC .............. G06F 16/958; G06F 16/9535; G06Q 10/087; G06Q 30/0641; G06Q 10/0833
See application file for complete search history.

(56) References Cited

U.S. PATENT DOCUMENTS 7,177,825 B1 2/2007 Borders et al.
8,156,013 B2 * 4/2012 Dearlove ............... G06Q 10/08
705/27.1
(Continued)

FOREIGN PATENT DOCUMENTS

JP 2001-297270 A 10/2001
JP 2001297270 A 10/2001
(Continued)

OTHER PUBLICATIONS

Decision of Patent Grant from the Korean Intellectual Property Office dated Mar. 25, 2022, for corresponding application No. 10-2021-0098588. (2 pgs.) and translation (2 pgs.).
(Continued)

*Primary Examiner* — Keith D Bloomquist
(74) *Attorney, Agent, or Firm* — Finnegan, Henderson, Farabow, Garrett & Dunner LLP

(57) ABSTRACT

A computerized system for generating dynamic websites that includes a memory storing instructions and at least one processor configured to execute the instructions to perform operations. The operations include receiving an order from a customer device, determining whether the destination address is eligible for delivery by a first time, and based on determining the destination address is eligible, searching a first database to retrieve information of the at least one product. The operations may also include generating a user interface element indicating whether delivery by the first time is possible (the user interface element being configured to modify a website displayed in the customer device) and sending the user interface element to the customer device. Further, the operations may include receiving a response from the customer device and modifying an entry in a second database to indicate the promised delivery date for the product is the first time.

20 Claims, 20 Drawing Sheets

(51) Int. Cl.
    *G06Q 10/08*     (2012.01)
    *G06F 16/9535*     (2019.01)

(56) References Cited

U.S. PATENT DOCUMENTS

| | | |
|---|---|---|
| 8,429,019 B1 | 4/2013 | Yeatts et al. |
| 8,635,113 B2 | 1/2014 | Borders et al. |
| 10,163,070 B1 | 12/2018 | Phillips et al. |
| 10,460,359 B1 | 10/2019 | Huang |
| 10,504,061 B1 | 12/2019 | Shi |
| 2004/0030604 A1 | 2/2004 | Young |
| 2010/0076903 A1* | 3/2010 | Klingenberg ........ G06Q 10/083 705/333 |
| 2013/0325741 A1 | 12/2013 | Smalling et al. |
| 2017/0026331 A1 | 1/2017 | Vijay et al. |
| 2017/0278062 A1 | 9/2017 | Mueller et al. |
| 2017/0316370 A1 | 11/2017 | Putcha et al. |
| 2018/0107977 A1 | 4/2018 | McHale et al. |
| 2018/0107979 A1 | 4/2018 | Westover et al. |
| 2019/0005439 A1* | 1/2019 | Nandury ................ H04L 29/08 |
| 2019/0197475 A1* | 6/2019 | Bianconcini ....... G06Q 10/0838 |

FOREIGN PATENT DOCUMENTS

| | | |
|---|---|---|
| JP | 2010-039961 A | 2/2010 |
| JP | 2010039961 A | 2/2010 |
| JP | 2018-203414 A | 12/2018 |
| KR | 10-2016-0090180 A | 7/2016 |
| KR | 10-2017-0056251 | 5/2017 |
| KR | 10-2017-0056251 A | 5/2017 |
| KR | 10-1735018 B1 | 5/2017 |
| KR | 101735018 B1 | 5/2017 |
| KR | 20170056251 A | 5/2017 |
| TW | 201340012 A | 10/2013 |

OTHER PUBLICATIONS

Worldwide Intellectual Property Service (WIPS) Search Report for counterpart Korean Patent Application No. 10-2020-0016346. Notification dated Aug. 12, 2020. 10 pages.
Market Kurly, How To Shop Marketkurly, Steemit, (https://signup.steemit.com), available Feb. 8, 2018.
Hong Kong Examination Notice from The Government of the Hong Kong Special Administrative Region Intellectual Property Department dated Jan. 18, 2022, for corresponding application 22020022240.8 (9 pages).
Office Action and search report from the Taiwan Intellectual Property Office dated Aug. 9, 2021, for counterpart ROC Application No. 109145461, dated Aug. 9, 2021 (11 pages) and translation (13 pages).
Supplementary European Search Report for corresponding application No. EP 20827977 dated Apr. 19, 2022.
Ajax (programming) Wikipedia, dated Apr. 7, 2022, pp. 1-9, https://en.wikipedia.org/w/index.php?title=Ajax_(programming)&oldid=928912669.

* cited by examiner

1600

```
<html>
  //EXEMPLARY SOURCE CODE FOR WEBSITE MODIFICATION
  <head>
    <title></title>                                                        } 1601
    <script type="text/javascript">
      function txnfn(){
        //GET DOCUMENT TYPE;
          if(document.getElementById("txnType").value=='SEARCH'){
          x=1;
        }else{
          if(document.getElementById("txnType").value=='SINGLE DISPLAY'){   } 1602
            x=2
        }
      }
      //GENERATE TEXT BOX WITH DATE FOR DELIVERY ESTIMATE
      function  txn40()
      {
        WHEN x=1      var dt = document.getElementById("txndt").value;
        var TEXTBOX = new Date(dt);                                          } 1604
            //CHANGE FOR DEFAULT FORMAT
          document.getElementById("duedt").value =
              dat.toLocaleFormat('%d-%b-%Y');
      }
    </script>
  </head>
  <body>
      PageType: <select name="search" id="display;">
      <option value="x=1">MODIFY FOR SEARCH</option>                        } 1606
      <option value="x=2">MODIFY FOR DISPLAY</option>
      </select>
    <br/><br/>
        //ADD OR MODIFY WEBPAGE
    Delivery date:<input id ="txndt" type="date"
    <br/><br/>
        <div id="duedtdiv">                                                  } 1608
    Timer date:<input id ="duedt" type="date" name ="due_date" readonly/>
        </div>
  </body>
</html>
```

FIG. 16

SYSTEMS AND METHODS FOR GENERATING DYNAMIC WEBSITES WITH HYPERMEDIA ELEMENTS

TECHNICAL FIELD

The present disclosure generally relates to computerized systems and methods for generating dynamic websites. In particular, embodiments of the present disclosure relate to systems and methods for determining available options for product delivery and generating user interfaces with hypermedia elements that modify websites, display user-specific information, or capture user information.

BACKGROUND

Hypermedia elements are nonlinear mediums of information that include graphics, audio, video, plain text and hyperlinks. The hypermedia elements include multiple interactive icons, text boxes, and/or playbacks. Hypermedia elements may be developed in several ways. For example, hypermedia elements may by programmed with tools that link data from internal variables and nodes for external data files. These hypermedia elements can be used in conjunction with multimedia development software but in some cases hypermedia elements may also be used as stand-alone applications, with emphasis on entertainment content. Hypermedia elements can be used in websites for user interfaces and for interactive actions. For instance, hypermedia elements may include hyperlinks that can be added to web source code for specific interactions, scripting, and/or hyperlinking features.

In the context of websites from online retailers hypermedia elements may be used to interact with users, display specific content, and/or gather user data for personalized interactions. For example, through hypermedia elements an online retailer may capture user preferences by presenting input windows and interactive icons. Therefore, online retailers may develop personalized websites when hypermedia elements are leveraged to build visitor profiles that may then be used for determining delivery preferences, capturing delivery instructions, and/or for recommendation algorithms. In some embodiments, hypermedia elements may also be used to display specific information in a website. Thus, hypermedia elements may be used to both request user input and, based on the user input, modify a website to display specific options or conditions. In such embodiments, hypermedia elements may be configured to dynamically modify websites specifically for users, providing online retailers tailored options for user interaction and tools to develop personalized websites.

Hypermedia elements, however, have not been successfully incorporated in certain web applications that require quick interactions between multiple data sources. Some web applications may use static data to generate hypermedia elements. For example, programming of certain hypermedia elements may be based on initialization cookies that selected when the user enters the website the first time. However, other applications use dynamic and time sensitive data to generate the hypermedia elements. For such applications, hypermedia elements may be generated based on timers or dynamic behaviors. In the case of online retailers, hypermedia elements may need to collect information within specific time windows to, for example, meet delivery dates. In such cases, querying data from multiple sources may delay website personalization and undermine the user's overall experience.

The disclosed systems and methods for generating dynamic websites address one or more of the problems set forth above and/or other problems in the prior art.

SUMMARY

One aspect of the present disclosure is directed to a computerized system for generating dynamic websites. The system may include a memory storing instructions and at least one processor configured to execute the instructions to perform operations. The operations may include receiving an order from a customer device (the order comprising at least one product for delivery, an order time, and a destination address), determining whether the destination address is eligible for delivery by a first time, and, based on determining the destination address is eligible, searching a first database to retrieve information of the at least one product (the information comprising a cutoff time for delivery by the first time). The operations may also include, based on the order time and the cutoff time, generating a user interface element indicating whether delivery by the first time is possible (where the user interface element is configured to modify a website displayed in the customer device) and sending the user interface element to the customer device. Further, the operations may also include, receiving a response responsive to sending the user interface element to the customer device and, based on the received response, modifying an entry in a second database to indicate a promised delivery date for the product is the first time.

Another aspect of the present disclosure is directed a computer-implemented method for generating dynamic websites. The method may include steps of receiving an order from a customer device (the order comprising at least one product for delivery, an order time, and a destination address), determining whether the destination address is eligible for delivery by a first time, and, based on determining the destination address is eligible, searching a first database to retrieve information of the at least one product (the information comprising a cutoff time for delivery by the first time). The method may also include generating a user interface element indicating whether delivery by the first time is possible based on the order time and the cutoff time (where the user interface element is configured to modify a website displayed in the customer device) and sending the user interface element to the customer device. Further, the method may include receiving a response responsive to sending the user interface element to the customer device and based on the received response, modifying an entry in a second database to indicate a promised delivery date for the product is the first time.

Yet another aspect of the present disclosure is directed to a non-transitory computer-readable medium storing instructions that, when executed by a processor, perform operations for generating a dynamic website. The operations may include receiving an order from a customer device (the order comprising at least one product for delivery, an order time, and a destination address), identifying fulfillment centers based on the destination address, requesting available inventory from identified fulfillment centers, and selecting a fulfillment center from the identified fulfillment centers based on a match between corresponding available inventory and the at least one product. The operations may also include determining a cutoff time for delivery by a first time based on an estimate expiration (the estimate expiration comprising an order expiration or remaining time after which delivery by the first time is no longer available), determining whether the destination address is eligible for delivery by the first time, and, based on determining the destination address is eligible, searching a first database to retrieve information of the at least one product, the information comprising a cutoff time for delivery by the first time. Further, the operations may include generating a user interface element indicating whether delivery by the first time is possible based on the order time and the cutoff time (the user interface element being configured to modify a website displayed in the customer device), searching a second database to locate the destination address and at least one associated restriction, and generating the user interface element to comprise a selectable element allowing delivery by the first time based on determining that the second database contains the destination address associated with a first restriction. Moreover, the operations may also include sending the user interface element to the customer device, receiving a response responsive to sending the user interface element to the customer device, and, based on the received response, modifying an entry in a third database to indicate a promised delivery date for the product is the first time.

BRIEF DESCRIPTION OF THE DRAWINGS

FIG. 16 is an exemplary source code of a script configurable to generate or modify a webpage with delivery date estimates and/or available delivery options.

DETAILED DESCRIPTION

Figure 1A:
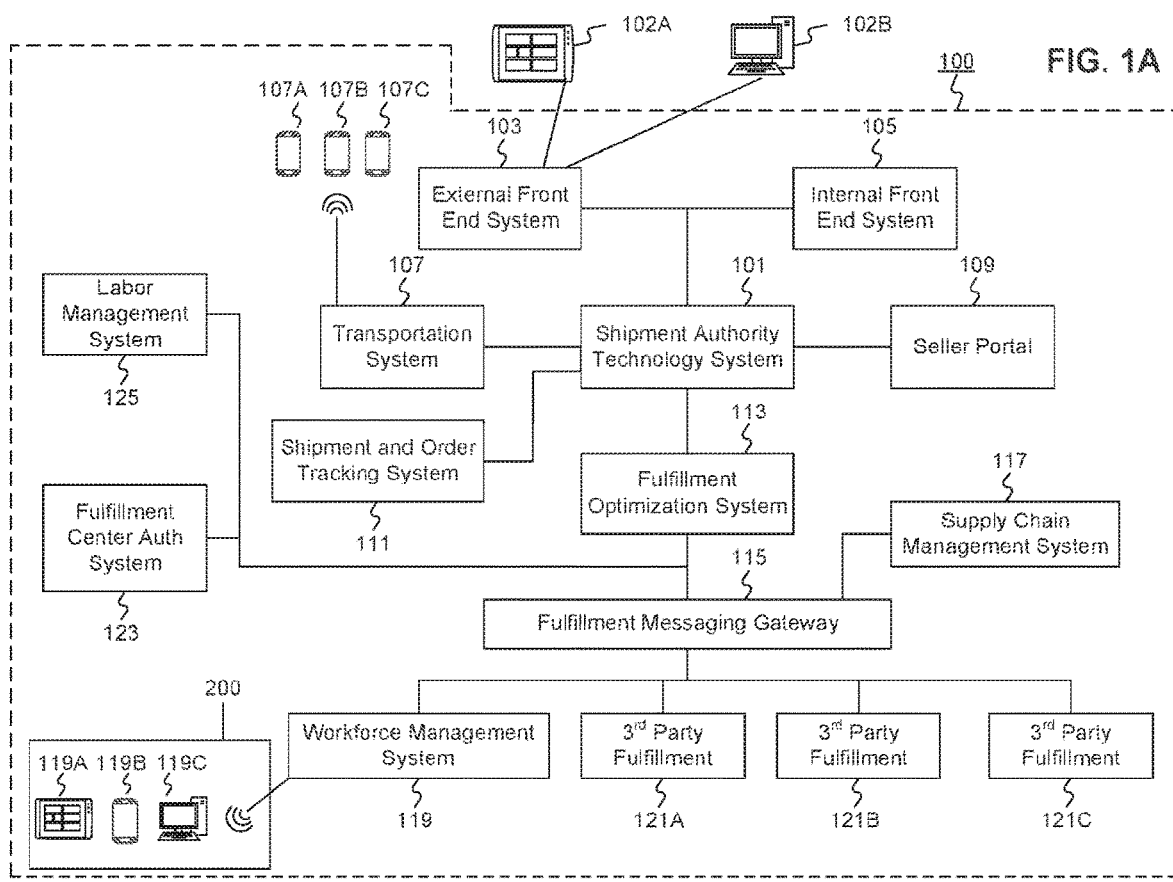
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
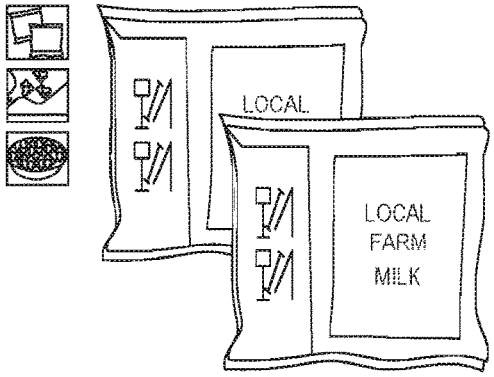
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods for generating dynamic and interactive websites. In particular, the disclosed systems and methods may enable the generation of user interface elements on websites displayed to users to capture user information or preferences. The user interface elements may include hypermedia elements or other interactive graphical user interfaces that allow requesting user input after receiving a user requests. The user interface elements may be configured to capture precise information or preferences from the user to prevent problems and provide a better user experience.

In some embodiments, the disclosed systems and methods may result in improved online retailer websites by enabling increased personalization and simplified workflows. For example, online retailers that offer multiple types of deliveries may use the disclosed systems and methods to modify websites to include user interface elements that gather information required for specific delivery options or indicate the type of available deliveries. In such embodiments, online retailers providing multiple delivery options may use user interface elements to unlock or permit certain type of deliveries. For instance, an online retailer may offer certain customers delivery after hours (e.g., delivery between midnight and 5 AM). Such online retailer may use disclosed user interface elements to request instructions for package delivery. The requested instructions may include a security code to enable physical access to the building, instructions on how to enter a building to deliver an item, or instructions to contact a doorman. Further, in some embodiments, the online retailer may analyze the instructions using machine-learning methods to determine if the instructions are satisfactory and would enable the proposed delivery method or type. Further, the disclosed systems and methods may improve overall delivery workflows by requiring certain user-specific information in order to enable certain deliveries. Therefore, the disclosed arrangement may improve online retailer website development by providing tools for greater customization and user interaction.

Moreover, some embodiments of the disclosed systems and methods may improve dynamic website development by reducing required user interactions. The disclosed systems may generate or modify websites based on pre-stored information or analysis of a specific client. For example, the disclosed systems and methods may use pre-stored information to generate hypermedia elements with default options. In this way, the disclosed systems and methods may facilitate website development by leveraging pre-stored information to reduce the number of interactive elements that should be programmed and generate simpler graphical user interfaces. For instance, an online retailer may store delivery information for specific addresses. Further, the online retailer may store delivery preferences and/or availability of delivery methods for the address. Depending on the stored preferences or historic information, the disclosed systems and methods may enable the configuration of pre-selected, or default selected, opt-in and opt-out options for different delivery options.

Further, to improve website maintenance and minimize data processing, the disclosed systems and methods may enable online retailers to categorize addresses or users based on delivery options availability. For instance, based on customer preferences, regions of the address, and/or historical records, the disclosed systems may categorize addresses in category groups and generate interactive elements for each one of the groups. Addresses may be categorized based on the availability of certain delivery times or methods. For example, an online retailer may provide delivery options for delivery at specific times of the day or at specific dates. In such embodiments, the delivery options may specify delivery by a first time, which may be a delivery preset to one or more of dawn deliveries (e.g., before 6 AM), before closing deliveries (e.g., before 6 PM deliveries), night deliveries (e.g., after 9 PM), and/or midnight deliveries, among others. Further, in some embodiments of the disclosed systems and methods, the first time deliveries may be pre-configured based on user preferences. For example, a user may prefer to have first time deliveries preconfigured as dawn deliveries. Additionally, or alternatively, the first time deliveries may be dynamically adjusted based on availability of delivery options and preferences. For example, first time deliveries may default as dawn deliveries, but if dawn deliveries are unavailable, first time deliveries may be re-configured as night deliveries or deliveries for other selected time(s) of the day. The categorization of delivery options at specific time of day and/or first time deliveries, may allow online retailers to improve personalization and efficiency of online deliveries by creating a system that allows categorizing addresses in groups of, for example, "no first time deliver," "first time delivery conditional," or "first time delivery by default." Based on the category, the disclosed systems and methods may allow online retailers to generate group-specific interactive elements. This kind of group processing and categorization of addresses and users may facilitate maintaining and generating websites.

The disclosed systems and methods may also use default selections in interactive elements to improve graphical user interfaces. Generating pre-configured interactive elements may improve selection accuracy by displaying a limited set of options or providing personalized recommendations. Having users in different categories and creating interactive elements specific for the respective user category, the disclosed systems and methods may prevent inaccurate selection and/or guide the user to a desired selections.

Moreover, certain embodiments of the disclosed systems and methods may be directed to computer operation improvements. For instance, disclosed systems and methods may result in dynamically produced multi-source hybrid webpages that include pop-up windows to request user feedback based on user behavior. Enabling multi-sourced displays within a single site may improve the technical field of generating dynamic websites for online shoppers. Moreover, the disclosed systems and methods may dynamically generate a webpage that combines information from fulfillment centers, shipping agents, customer accounts, and user selections to generate a hybrid webpage that shows product information and delivery options.

Furthermore, the disclosed systems and methods improve the adaptability of webpages to dynamically gather specific feedback from users. The disclosed systems and methods may facilitate updating webpages by having dynamic hypermedia elements that may be updated in real time based on user preferences, fulfillment center options, and delivery conditions. Such configuration may improve user experience when navigating in a webpage.

Reference will now be made in detail to the disclosed embodiments, examples of which are illustrated in the accompanying drawings.

FIG. 1A shows a schematic block diagram of system 100 illustrating an exemplary embodiment of a system comprising computerized systems for communications enabling shipping, transportation, and logistics operations. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front-end system 103, an internal front-end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, workforce management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front-end system 103 and FO system 113.

External front-end system 103, in some embodiments, may be implemented as a computer system that enables external users to interact with one or more systems in system 100. For example, in embodiments where system 100 enables the presentation of systems to enable users to place an order for an item, external front-end system 103 may be implemented as a web server that receives search requests, presents item pages, and solicits payment information. For example, external front-end system 103 may be implemented as a computer or computers running software such as the Apache HTTP Server, Microsoft Internet Information Services (IIS), NGINX, or the like. In other embodiments, external front-end system 103 may run custom web server software designed to receive and process requests from external devices (e.g., mobile device 102A or computer 102B), acquire information from databases and other data stores based on those requests, and provide responses to the received requests based on acquired information.

In some embodiments, external front-end system 103 may include one or more of a web caching system, a database, a search system, or a payment system. In one aspect, external front-end system 103 may comprise one or more of these systems, while in another aspect, external front-end system 103 may comprise interfaces (e.g., server-to-server, database-to-database, or other network connections) connected to one or more of these systems.

Moreover, in some embodiments, external front-end system 103 may include memory devices storing categorizations for delivery addresses. For example, based on use selections, previous deliveries, or availability of delivery methods in certain regions, external front-end system 103 may categorize delivery addresses for first time and/or dawn deliveries. For instance, external front-end system 103 may include data bases that correlate each delivery address with one of "non delivery at dawn," "conditional delivery at dawn," or "unconditional delivery at dawn."

An illustrative set of steps, illustrated by FIGS. 1B, 1C, 1D, and 1E, will help to describe some operations of external front-end system 103. External front-end system 103 may receive information from systems or devices in system 100 for presentation and/or display. For example, external front-end system 103 may host or provide one or more web pages, including a Search Result Page (SRP) (e.g., FIG. 1B), a Single Display_Page (SDP) (e.g., FIG. 1C), a Cart page (e.g., FIG. 1D), or an Order page (e.g., FIG. 1E). A user device (e.g., using mobile device 102A or computer 102B) may navigate to external front-end system 103 and request a search by entering information into a search box. External front-end system 103 may request information from one or more systems in system 100. For example, external front-end system 103 may request information from FO System 113 that satisfies the search request. External front-end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front-end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. In some embodiments, the SRP may also include delivery options, cutoff times for delivery options and/or hypermedia elements requesting user input. External front-end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front-end system 103. In response, external front-end system 103 may request information related to the selected product. For example, the information may include additional information beyond that presented for a product on the respective SRP. This could include, for example, shelf life, country of origin, weight, size, number of items in package, handling instructions, cutoff time for dawn or first time deliveries, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front-end system 103 may prepare an SDP (Single Display Page) (e.g., FIG. 1C) based on the received product information, location of the customer device, and availability of delivery options. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front-end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. Alternatively, or additionally, the user may interact with the SDP by providing instructions for delivery. The user device may transmit this request to add the product to the shopping cart to external front-end system 103.

Figure 1D:
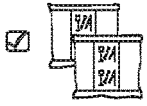
FIG. 1D depicts a sample cart page that includes items in a virtual shopping cart along with interactive user interface elements, consistent with the disclosed embodiments.
Figure 1E:
FIG. 1E depicts a sample order page that includes items from the virtual shopping cart along with information regarding purchase and shipping, along with interactive user interface elements, consistent with the disclosed embodiments.

External front-end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front-end system 103. In some embodiments, the Cart page may include text box inputs, interactive icons, or recommendation messages for each product delivery.

External front-end system 103 may generate an order page (e.g., FIG. 1E) in response to receiving the request to initiate a purchase. The order page, in some embodiments, re-lists the items from the shopping cart and requests input of payment and shipping information. For example, the order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front-end system 103 may send the Order page to the user device.

The user device may enter information on the order page and click or otherwise interact with a user interface element that sends the information to external front-end system 103. From there, external front-end system 103 may send the information to different systems in system 100 to enable the creation and processing of a new order with the products in the shopping cart. In some embodiments, external front-end system 103 may be further configured to enable sellers to transmit and receive information relating to orders.

Internal front-end system 105, in some embodiments, may be implemented as a computer system that enables internal users (e.g., employees of an organization that owns, operates, or leases system 100) to interact with one or more systems in system 100. For example, in embodiments where SAT system 101 enables the presentation of systems to enable users to place an order for an item, internal front-end system 105 may be implemented as a web server that enables internal users to view diagnostic and statistical information about orders, modify item information, or review statistics relating to orders. For example, internal front-end system 105 may be implemented as a computer or computers running software such as the Apache HTTP Server, Microsoft Internet Information Services (IIS), NGINX, or the like. In other embodiments, internal front-end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front-end system 105 may include one or more of a web caching system, a database, a search system, a payment system, an analytics system, an order monitoring system, or the like. In one aspect, internal front-end system 105 may comprise one or more of these systems, while in another aspect, internal front-end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more users (e.g., a delivery worker) or a vehicle (e.g., a delivery truck). In some embodiments, shipment and order tracking system 111 may also request information from workforce management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front-end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front-end system 103, SAT system 101, shipment and order tracking system 111). In other embodiments, FO system 113 may receive electronic requests from one or more systems (e.g., external front-end system 103, SAT system 101, shipment and order tracking system 111) and calculate the PDD on demand. In yet other embodiments, FO system 113 may determine PDD as a user navigates through one of the webpages. Moreover, in some embodiments FO system 113 may determine whether products displayed are eligible to first time delivery options. For example, FO system 113 may determine whether products are eligible for dawn deliveries based on the product location, customer location, and/or a specific delivery address. Moreover, in some embodiments FO system 113 may determine available delivery options. For example, FO system 113 may determine whether one or more products are eligible for a specific delivery option, such as dawn delivery or fresh delivery.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Workforce management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and checkout information from a timekeeping system, such as a timekeeping system operated on a device 119A-119C.

3rd party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front-end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
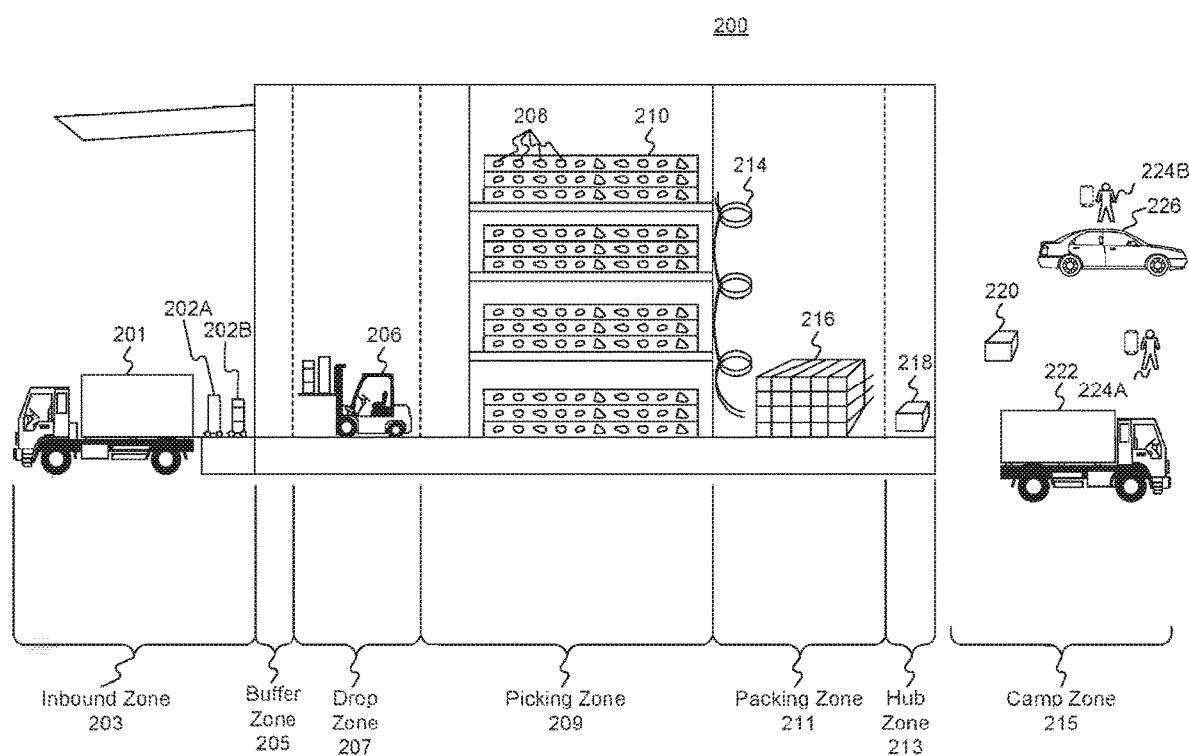
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones or locations, each of which are depicted in FIG. 2. These "zones," in some embodiments, may be thought of as virtual divisions between different stages of a process of receiving items, storing the items, retrieving the items, and shipping the items. So, while the "zones" are depicted in FIG. 2, other divisions of zones are possible and the zones in FIG. 2 may be omitted, duplicated, and/or modified in some embodiments.

Inbound zone 203 represents an area of FC 200 where items are received from sellers who wish to sell products using system 100 (FIG. 1A). For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 1198.

Once a user places an order, a picker may receive an instruction on device 1198 to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
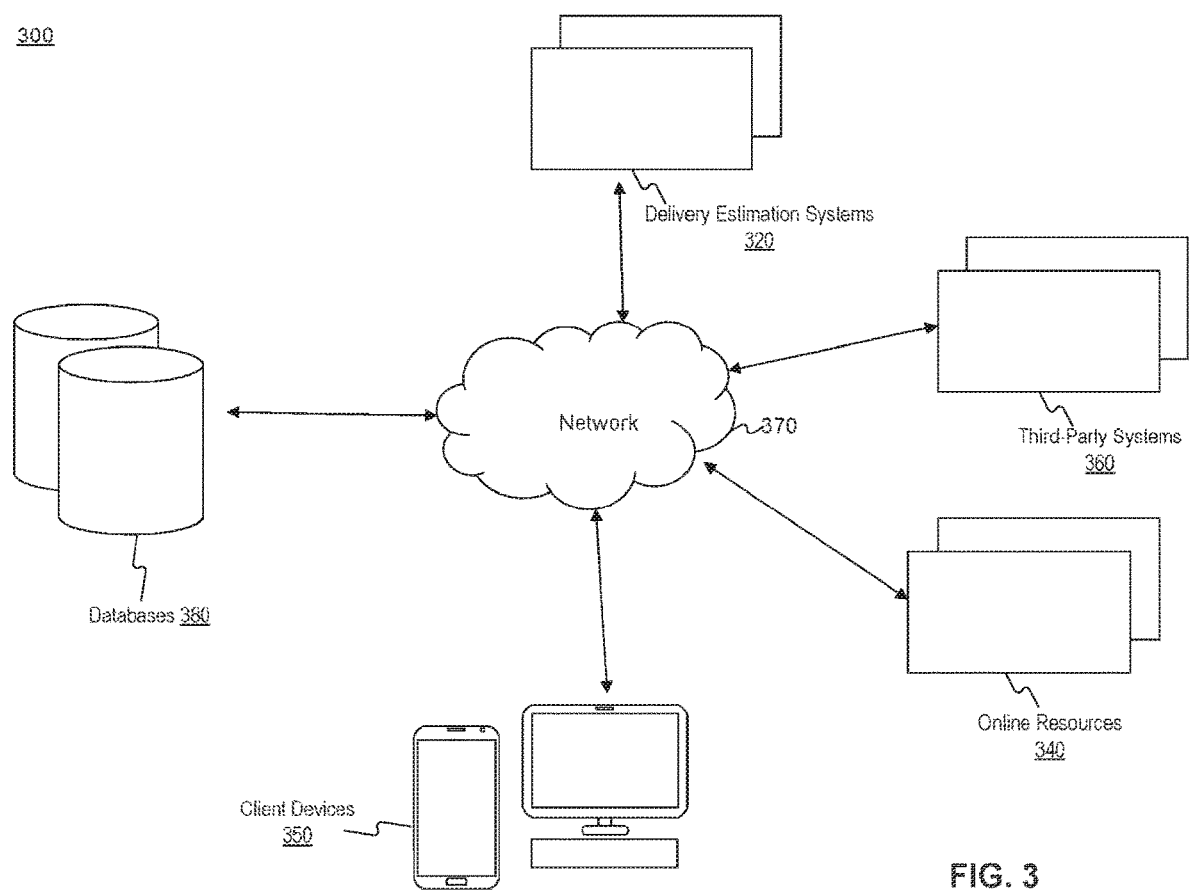
FIG. 3 is a schematic block diagram of an exemplary system, consistent with disclosed embodiments.

FIG. 3 is a block diagram of an exemplary system 300, consistent with disclosed embodiments. In system 300, delivery estimation systems 320 may process product requests from real-time client device's data streams to, for example, determine the delivery methods available for the request. The delivery methods or options may include first time deliveries (which may include dawn deliveries), rushed deliveries, fresh deliveries, among others. Delivery estimation system 320 may also generate instructions to display or modify a webpage to include icons representative of the available delivery options and/or interactive tools to collect instructions or user preferences.

System 300 may include, in addition to delivery estimation systems 320, online resources 340, client devices 350, third-party systems 360, client systems 390, and databases 380. In some embodiments, as shown in FIG. 3, components of system 300 may be connected to a network 370. However, in other embodiments components of system 300 may be connected directly with each other, without network 370. For example, databases 380 may be directly coupled to delivery estimation systems 320.

In some embodiments, delivery estimation systems 320 may be implemented with one or more of the components of system 100 (FIG. 1A). For example, delivery estimation systems 320 may include SAT system 101, external front-end system 103, FO system 113, SCM system 117, and/or WMS 119 (FIG. 1A). In other embodiments, delivery estimation systems 320 may be implemented with one or more independent servers configured to perform operations for estimating a delivery date, generating a PDD, categorizing addresses based on the availability of specific delivery methods, and/or generating webpages for client devices 350.

Online resources 340 may include one or more servers or storage services provided by an entity such as a provider of webpage hosting, networking, cloud, or backup services. In some embodiments, online resources 340 may be associated with hosting services or servers that store web pages for authentication services, Domain Name System (DNS), or landing pages. In other embodiments, online resources 340 may be associated with a cloud computing service. In yet other embodiments, online resources 340 may be associated with a messaging service, such as, for example, Apple Push Notification Service, Azure Mobile Services, or Google Cloud Messaging. In such embodiments, online resources 340 may handle the delivery of messages and notifications related to functions of the disclosed embodiments, such as handling digital rights management.

Client devices 350 may include one or more computing devices configured to perform one or more operations consistent with disclosed embodiments. For example, client devices 350 may include a desktop computer, a laptop, a server, a mobile device (e.g., tablet, smart phone, etc.), a set-top box, a gaming device, a wearable computing device, or other type of computing device. In some embodiments, client devices 350 may include the user devices 102 (FIG. 1A) and be operated as part of system 100. In other embodiments, however, client devices 350 may be independent from system 100. Client devices 350 may include one or more processors configured to execute software instructions stored in memory, such as memory included in client devices 350, to perform operations to implement the functions described below. For example, client devices 350 may be configured to display graphical user interfaces in webpages that include icons with delivery options and/or delivery date estimates generated by delivery estimation systems 320. Further, client devices 350 may be configured for wired and/or wireless communications and may include software that when executed by a processor performs internet-related communication (e.g., TCP/IP) and content display processes. For instance, client devices 350 may execute browser software that generates and displays interfaces with product information. Thus, client devices 350 may execute applications that allow client devices 350 to communicate with components over network 370 and display content in interfaces via display devices included in client devices 350.

In some embodiments, as further described below in connection to FIG. 4, client devices 350 may run applications specifically configured to interact with delivery estimation systems 320. Moreover, client devices 350 may store one or more accounts. For example, client devices 350 may store information about a customer's delivery preferences, the customer's location, customer account, and customer identification.

The disclosed embodiments are not limited to any particular configuration of client devices 350. For instance, a client device 350 may be a mobile device that stores and executes mobile applications to perform operations that provide functions offered by delivery estimation systems 320 and/or online resources 340. In certain embodiments, client devices 350 may be configured to execute software instructions relating to location services, such as GPS locations. For example, client devices 350 may be configured to determine a geographic location and provide location data and time stamp data corresponding to the location data. Client devices 350 are further described in connection with FIG. 4.

Databases 380 may include one or more computing devices configured with appropriate software to perform operations consistent with providing delivery estimation systems 320 data for calculating and/or retrieving estimated delivery dates. Databases 380 may include, for example, Oracle™ databases, Sybase™ databases, or other relational databases or non-relational databases, such as Hadoop™ sequence files, HBase™, or Cassandra™. Databases 380 may include computing components (e.g., database management system, database server, etc.) configured to receive and process requests for data stored in memory devices of the database(s) and to provide data from the database(s).

While databases 380 are shown separately, in some embodiments databases 380 may be included in, or otherwise related to delivery estimation systems 320 or online resources 340.

Databases 380 may be configured to collect and/or maintain data associated with user accounts or products to facilitate determination of available delivery options. For example, databases 380 may store information about user profiles for users of system 300. Further, databases 380 may store information about addresses, including delivery options available for the address. Databases 380 may also store previously calculated delivery dates for a specific product and corresponding postal code, to quickly respond to delivery date estimation requests that have similar product and postal code pair. Databases 380 may collect the data from a variety of sources, including, for instance, online resources 340 or third-party systems 360. Further, databases 380 may include information about client devices 350 operating systems. Databases 380 are further described below in connection with FIG. 5.

In some embodiments, third-party systems 360 may include one or more elements of system 100. For example, third-party systems 360 may include 3PL systems 121A-121C (FIG. 1). Additionally, or alternatively, third-party systems 360 may include one or more servers or storage services provided by an entity related to delivery estimation systems 320, such as a provider of services or a fulfillment center. Third-party systems 360 may also be connected to system 300 via network 370, but in other embodiments third-party systems 360 may include direct connections with some elements of system 300. For example, to minimize delays or network congestion, third-party systems 360 may be connected in a private network with delivery estimation systems 320. Further, third-party systems 360 may be configured to provide and/or request information from delivery estimation systems 320, or other elements of system 300. In some embodiments, while third-party systems 360 may also be coupled to network 370, they may not be clients of delivery estimation systems 320. Instead, third-party systems 360 may include systems that include information of users or clients of delivery estimation systems 320. For example, third-party systems 360 may include servers of delivery contractors such as FedEx®, which may be used by delivery estimation systems 320 when a product delivery involves a third-party contractor.

Network 370 may be any type of network configured to provide communications between components of system 300. For example, network 370 may be any type of network (including infrastructure) that provides communications, exchanges information, and/or facilitates the exchange of information, such as the Internet, a Local Area Network, near field communication (NFC), or other suitable connection(s) that enables the sending and receiving of information between the components of system 300. In other embodiments, one or more components of system 300 may communicate directly through a dedicated communication link(s). In yet other embodiments, network 370 may include multiple networks, organizing for example a network or networks.

It is to be understood that the configuration and boundaries of the functional building blocks of system 300 have been defined herein for the convenience of the description. Alternative boundaries can be defined so long as the specified functions and relationships thereof are appropriately performed. Alternatives (including equivalents, extensions, variations, deviations, etc., of those described herein) will be apparent. Such alternatives fall within the scope of the disclosed embodiments.

Figure 4:
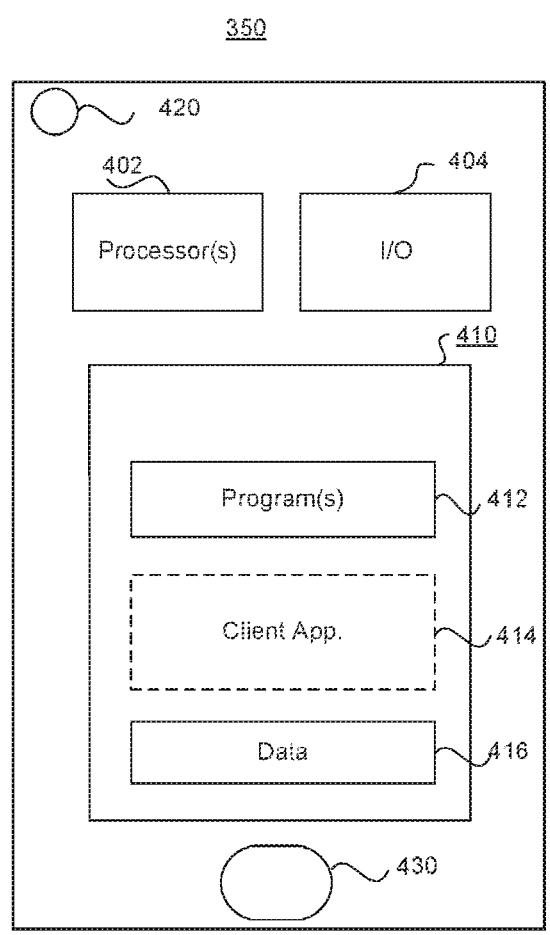
FIG. 4 is a block diagram of an exemplary client device, consistent with disclosed embodiments.

Referring now to FIG. 4, there is shown a block diagram of an exemplary client device 350 (FIG. 3), consistent with disclosed embodiments. In some embodiments, client devices 350 may implement user devices 102 (FIG. 1A).

In one embodiment, client devices 350 may include one or more processors 402, one or more input/output (I/O) devices 404, and one or more memories 410. In some embodiments, client devices 350 may take the form of mobile computing devices such as smartphones or tablets, general purpose computers, or any combination of these components. Alternatively, client devices 350 (or systems including client devices 350) may be configured as a particular apparatus, embedded system, dedicated circuit, and the like based on the storage, execution, and/or implementation of the software instructions that perform one or more operations consistent with the disclosed embodiments. According to some embodiments, client devices 350 may include web browsers or similar computing devices that access web site consistent with disclosed embodiments.

Processor 402 may include one or more known processing devices, such as mobile device microprocessors manufactured by Intel™, NVIDIA™, or various processors from other manufacturers. The disclosed embodiments are not limited to any specific type of processor configured in client devices 350.

Memory 410 may include one or more storage devices configured to store instructions used by processor 402 to perform functions related to disclosed embodiments. For example, memory 410 may be configured with one or more software instructions, such as programs 412 that may perform operations when executed by processor 402. The disclosed embodiments are not limited to separate programs or computers configured to perform dedicated tasks. For example, memory 410 may include a single program 412 that performs the functions of the client devices 350, or program 412 may include multiple programs. Memory 410 may also include a client application 414 which may configure client devices 350 to communicate or execute operations to interact with other elements of system 300. For example, client application 414 may specify instructions to communicate with delivery estimation systems 320 and/or generate product information requests, as further described in connection with FIG. 7. In addition, client applications 414 may interpret instructions for generating graphical user interfaces (GUI) in client devices 350 or modifying displayed GUI. Memory 410 may also store data 416 that may be used by delivery estimation systems 320 to assign delivery estimates, delivery categories, or PDDs to the client device.

In certain embodiments, memory 410 may store instructions for accessing or sending requests to delivery estimation systems 320. For example, memory 410 may include an application that communicates with delivery estimation systems 320 via TCP/IP. Moreover, other software components may be configured to request information from delivery estimation systems 320 or determine the location of client devices 350. For instance, these software instructions, when executed by processor(s) 402, may process information to display an estimated delivery date or PDD in a webpage. The software instructions may also implement scripts to modify webpages being displayed in client devices 350.

I/O devices 404 may include one or more devices configured to allow data to be received and/or transmitted by client devices 350 and to allow client devices 350 to communicate with other machines and devices, such as other components of system 300. For example, I/O devices 404 may include a screen for confirming delivery of a parcel or providing information to the user. I/O devices 404 may also include components for NFC communication. I/O devices 404 may also include one or more digital and/or analog devices that allow a user to interact with client devices 350 such as a touch-sensitive area, buttons, or microphones. I/O devices 404 may also include one or more accelerometers to detect the orientation and inertia of client devices 350. I/O devices 404 may also include other components known in the art for interacting with delivery estimation systems 320.

In some embodiments, client device 350 may also include a camera 420 that capture images and may be used for identification of a product that the user wants. Such identification may trigger the delivery date estimation or PDD calculation. Additionally, or alternatively, client devices 350 may include a fingerprint sensor 430 that allows users to unlock client devices 350 to access their accounts, send request for information, and purchase items. Both camera 420 and fingerprint sensor 430 may be operated by processor 402 and use encryption security to make it impossible for users to externally access fingerprint or camera information.

The components of client devices 350 may be implemented in hardware, software, or a combination of both hardware and software, as will be apparent to those skilled in the art.

Figure 5:
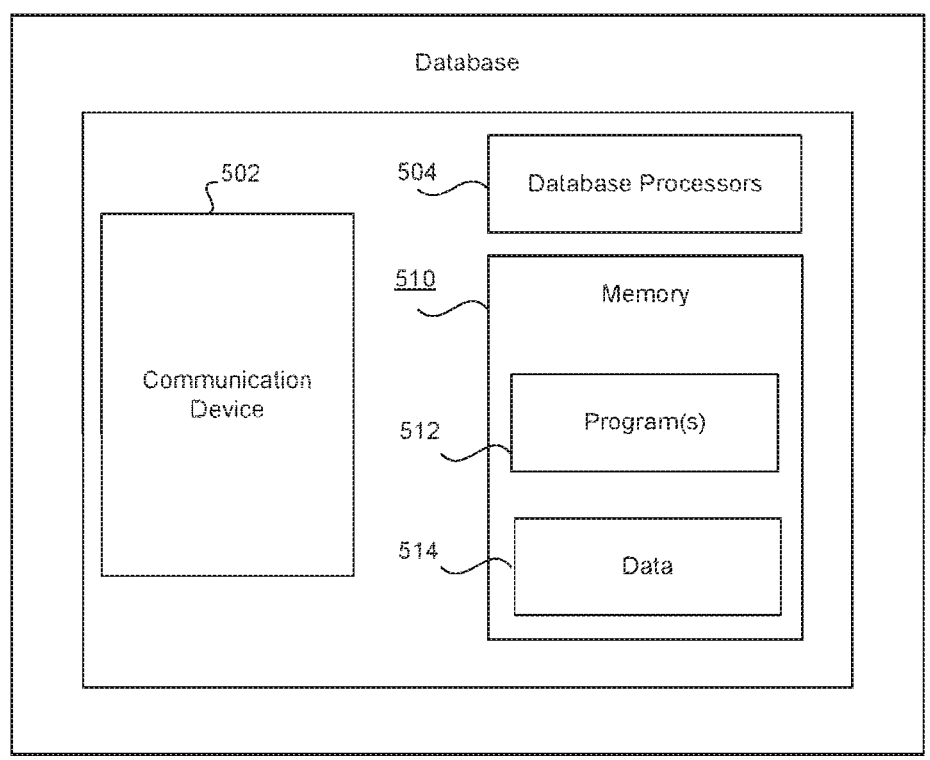
FIG. 5 is a block diagram of an exemplary database, consistent with disclosed embodiments.

Referring now to FIG. 5, there is shown a block diagram of an exemplary databases 380 (FIG. 3), consistent with disclosed embodiments. In some embodiments, databases 380 may be included in elements of system 100. For example, databases 380 may be part of the FO system 113 or the WMS 119 (FIG. 1A).

Databases 380 may include a communication device 502, one or more database processors 504, and database memory 510 including one or more database programs 512 and data 514. Databases 380 may include NoSQL databases such as HBase, MongoDB™ or Cassandra™. Alternatively, databases 380 may include relational databases such as Oracle, MySQL and Microsoft SQL Server.

In some embodiments, databases 380 may take the form of servers, general purpose computers, mainframe computers, or any combination of these components. In some embodiments, databases 380 are included within other elements of system 300, such as delivery estimation systems 320. Other implementations consistent with disclosed embodiments are possible as well.

In some embodiments, databases 380 may include both non-relational and embedded databases. For example, databases 380 may include a non-relational database, such as an Hbase, and an embedded database, such as a RocksDB (e.g., a key-value store database).

Communication device 502 may be configured to communicate with one or more components of system 300 or system 100, such as online resources 340, delivery estimation systems 320, or SCM system 117. In particular, communication device 502 may be configured to provide delivery estimation systems 320 order information, user preferences and privileges, and/or historic previous estimations for similar postal codes and products inquiries.

The components of databases 380 may be implemented in hardware, software, or a combination of both hardware and software. For example, although one or more components of databases 380 may be implemented as computer processing instruction modules, all or a portion of the functionality of databases 380 may be implemented instead in dedicated electronics hardware.

Database memory 510 may include programs 512, which may include instructions to update webpages based on availability of delivery options or PDDs received or generated by delivery estimation systems 320. Further, database memory 510 may include instructions for communications between elements of system 300. For example, database memory 510 may include instructions for communications between client devices 350 and delivery estimation systems 320. Further, programs 512 may include instructions to store information in real-time as it is processed by delivery estimation systems 320.

Data 514 may also be data associated with webpages, such as online resources 340, or user accounts from client devices 350. Data 514 may include, for example, information relating to previous delivery notices associated with specific delivery addresses or postal codes. Further, data 514 may include a categorization for delivery addresses. Data 514 may also include content files and accumulation variables to evaluate capacity of fulfillment centers and order availability.

Figure 6:
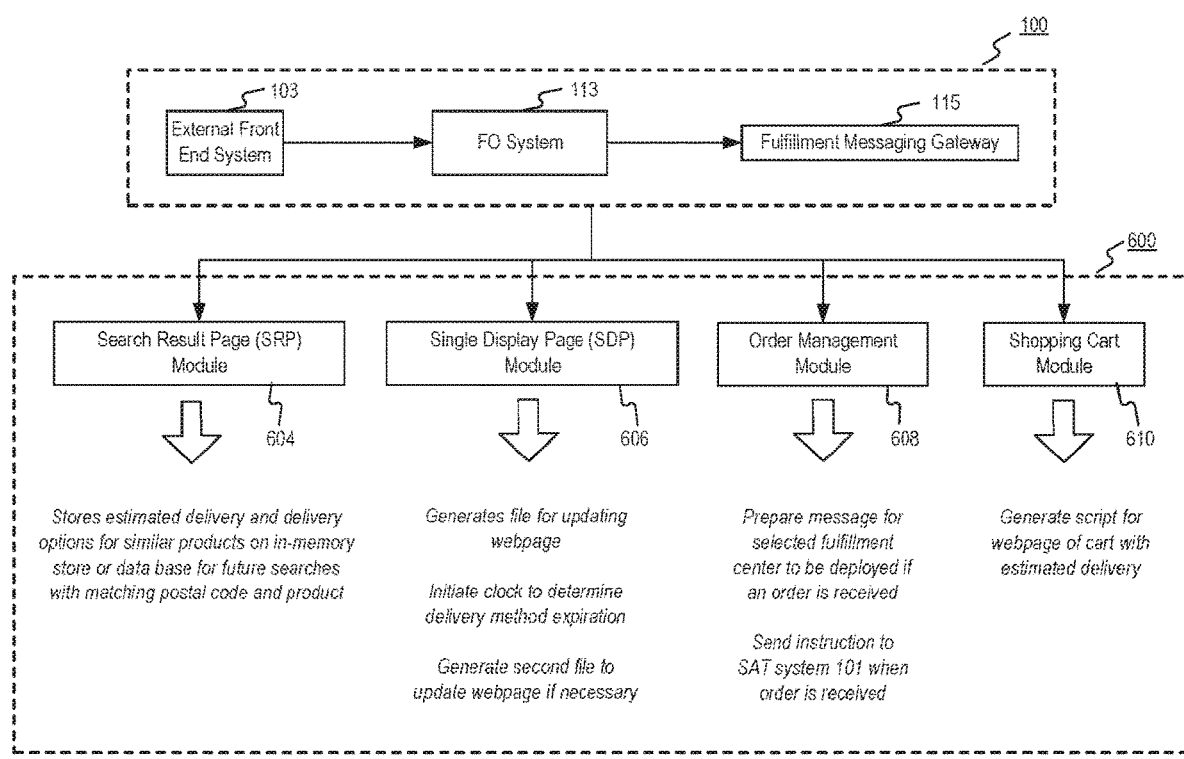
FIG. 6 is a process flow diagram of an exemplary delivery estimation distribution to online modules, consistent with disclosed embodiments.

FIG. 6 is a process flow diagram of an exemplary delivery estimation distribution, consistent with disclosed embodiments. In some embodiments, system 100, or portions of system 100, may perform calculations to determine an estimated delivery and/or available delivery methods. System 100 may then transmit PDDs or delivery option availability to online modules 600 that generate webpages for client interaction.

In some embodiments, as shown in FIG. 6, elements of system 100 may communicate with each other to generate an estimated delivery date. For example, external front-end system 103 may receive a request for a delivery estimate from user devices 102A-102B (FIG. 1A). The request may then be transmitted to an FO system 113 that may determine a selected fulfillment center and an estimated delivery time. Then FO system 113 may send the selected fulfillment center and estimated delivery date to fulfillment messaging gateway 115. In turn fulfillment messaging gateway 115 may send the information to the online modules 600.

Online modules 600 may include a search result page (SRP) module 604, a single display page (SDP) module 606, an order management module 608, and a shopping cart module 610. Each one of the modules may generate different webpages for display to consumers. For example, SRP module 604 may generate result pages (like the one described in connection with FIG. 1B) for user devices 102, while SDP module 606 may generate single product webpages (like the one described in connection with FIG. 1C) for user devices 102. Similarly, order management module 608 may generate or update order pages (like the one described in connection with FIG. 1E) while shopping cart module 610 may generate or update cart pages (like the one described in connection with FIG. 1D). Therefore, each one of online modules 600 may incorporate the estimated delivery date or available delivery options from system 100 in the webpages that are been displayed to customers.

Moreover, each one of online modules 600 may perform different operations when receiving estimated delivery dates. For example, after receiving available delivery options SRP module 604 may categorize delivery addresses, based on user selections or historic information, in cache memory for future searches. Then, when SRP module 604 receives a search request—within the expiration time associated with the PDD or a delivery option cutoff—that has the same or similar postal code and product, SRP module 604 does not need to query system 100. Instead, SRP module 604 may immediately update the search webpage based on previous information. Conversely, SDP module 606 may generate files for updating product webpages when receiving a PDD or available delivery options. For example, SDP module 606 may generate a JavaScript or HTML file that updates the product webpage to include interactive icons that show available delivery options, such as a first time delivery to expedite the deliveries. Further SDP module 606 may initiate a clock or timer to determine if the delivery date estimation has expired. In such embodiments, SDP module 606 may generate a second file to update the single product webpage if necessary (e.g., the estimated delivery time has expired, or certain delivery options are no longer available).

Moreover, order management module 608 may also react to receiving PDDs or delivery options for a product from system 100. For example, in response to receiving available delivery options, order management module 608 may prepare an electronic message for a selected fulfillment center. This preparatory message may be configured to be deployed if an order is received. In this way, online modules 600 may prepare for potential orders and facilitate meeting the a PDD by minimizing delays between order and transmission to fulfillment centers. In some embodiments, order management module 608 may be coupled to SAT system 101 (FIG. 1A) and the preparatory message may be forwarded to SAT system 101 as soon as an order is received. Moreover, shopping cart module 610 may generate a script for updating cart webpages using the delivery date information. For example, shopping cart module 610 may modify cart webpages to include timers and/or counters based on the expiration times of the estimated delivery dates.

Figure 7:
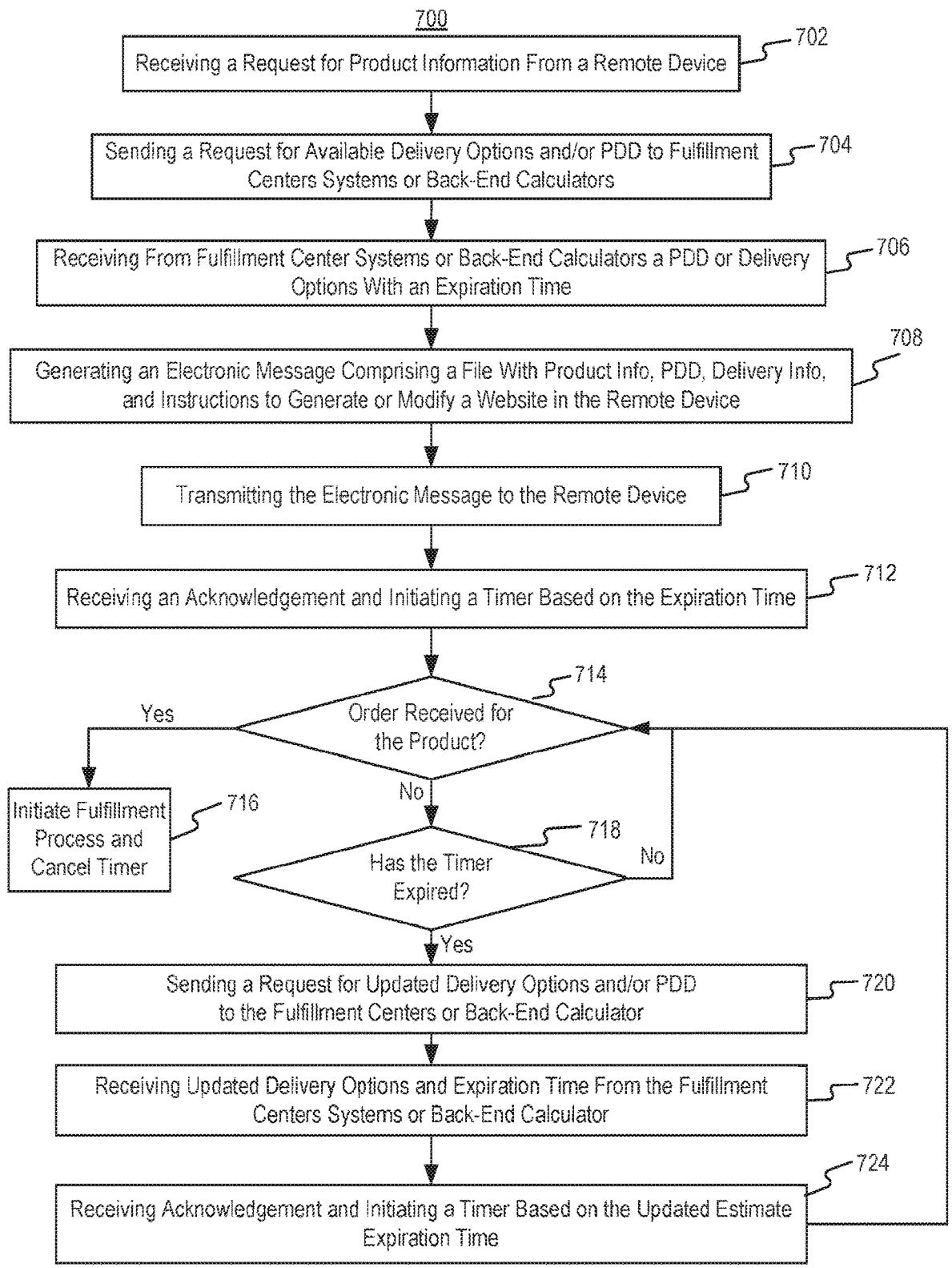
FIG. 7 is a flow chart of an exemplary process for handling a request for available delivery options, consistent with disclosed embodiments

FIG. 7 is a flow chart of an exemplary process 700 for handling a request for available delivery options, consistent with disclosed embodiments. In some embodiments, elements of system 300 may perform process 700. For example, as disclosed in the steps description below, delivery estimation systems 320 may perform process 700. This is just an illustrative example of process 700, however, and in other embodiments system 100, or parts of system 100, may perform process 700. For example, Shipment Authority Technology System 101, FO System 113, and/or FC Auth 123 (FIG. 1A) may perform one or more of the steps in process 700.

In step 702, delivery estimation systems 320 may receive a request for product information from a remote device. For example, as a user of client devices 350 navigates in a webpage, client devices 350 may send a request for product information to delivery estimation systems 320. Moreover, the request may include a username, a postal code, a physical location, and/or a delivery address. Alternatively, or additionally, delivery estimation systems 320 may receive the request from online resources 340. Online resources 340 may communicate with delivery estimation systems 320 to request product and estimated delivery information to prepare webpages. Further, online modules 600 may send requests for product information, estimated delivery, and/or product availability.

In step 704, delivery estimation systems 320 may send a request for delivery options and delivery estimate based on the information received from the request in step 702. Delivery estimation systems 320 may prepare and send a request to other elements of system 300 or system 100. For example, delivery estimation systems 320 may prepare a request for estimated delivery and PDD for FO system 113. In such embodiments, the FO system 113 may act as a second system that includes in-memory storage comprising multiple delivery dates for different products that have been previously calculated. Alternatively, or additionally, delivery estimation systems 320 may include front-end and back-end portions. In such embodiments, the front-end may be configured to receive and process requests while the back-end may be configured to compute PDD or estimate target deliveries. Like with FO system 113, the back-end portions of delivery estimation systems 320 may include multiple delivery dates or cutoffs for different products to minimize calculations whenever a request is similar to a previous request that has not expired. In these embodiments, the front-end of delivery estimation systems 320 may be configured to receive requests and immediately transmit them to the back-end portion of delivery estimation systems 320, which performs the calculations for PDD or determine available delivery options for the specific address. Further, in some embodiments, the request for estimated delivery options or delivery date may include the product information and customer information (such as the postal code associated with the user).

In some embodiments, the request for delivery estimate of step 704 may be directed to a specific type of fulfillment center. For example, the product information received with the request in step 702 may be associated with a fresh product (e.g., products such as fruits, vegetables, other type of produce and/or other perishable items). If the request for product information is associated with fresh products, delivery estimation systems 320 may tailor the request for available delivery options for the fresh product and send it to a specific fulfillment center. For instance, when delivery estimation systems 320 determine the client is requesting information for a fresh product, estimation systems 320 may associate a customer region with the remote device and determine a fresh fulfillment center (i.e., a fulfillment center that carries fresh products) that serves the customer region. Estimation system 320 may then transmit the request for available delivery options to the fresh fulfillment center.

Moreover, in some embodiments the request for delivery estimate or delivery options of step 704 may be directed to a specific fulfillment center based on the fulfillment center location or capacity. For example, some requests may be associated with specific delivery types. The specific delivery types may include "Fresh" deliveries, for products that may expire quickly, or "Dawn" deliveries. Fresh and Dawn deliveries may be services for specific customer accounts that allow users to get a perishable product or receive items by dawn next day. If the request for product information is associated with a dawn delivery service, estimation system 320 may create a specific request directed to fulfillment centers based on location.

Specific delivery types, such as fresh, first time, or dawn deliveries, may trigger a delivery process or mechanism that differ from nonspecific delivery types. For example, for dawn deliveries delivery estimation systems 320 may select fulfillment centers in system 100 based on a dawn cutoff time. In such embodiments, delivery estimation systems 320 may determine that products ordered from a fulfillment center before the dawn cutoff time can be delivered by dawn next day. However, products ordered from the fulfillment center after the dawn cutoff time cannot be delivered by dawn. Further, fulfillment centers in system 300 may have a designed coverage area. Based on fulfillment centers dawn cut off times and coverage area, delivery estimation systems 320 may route the request for product information to a specific fulfillment center in step 704. For example, delivery estimation systems 320 may identify fulfillment centers that may accept a dawn delivery request based on the distance between the fulfillment center and the remote device. While fulfillment centers that are far away may have an early cutoff, fulfillment centers that are close may have a later cutoff. Thus, delivery estimation systems 320 may direct request for delivery estimate only to fulfillment centers that may complete the order by dawn in step 704.

Arranging fulfillment centers with cutoff times and service regions for dawn deliveries, may allow delivery estimation systems 320 to minimize network congestion when resolving dawn delivery requests. By performing determinations before transmitting requests to fulfillment center brokers, delivery estimation systems 320 may be able to minimize the number of communications when handling dawn deliveries, which may be highly time sensitive. Moreover, such embodiments allow delivery estimation systems 320 to offer dawn delivery service for as long as possible and covering a large area.

In step 706, delivery estimation systems 320 may receive a delivery options available and/or PDDs. For example, delivery estimation systems 320 may receive a PDD from FO system 113. Alternatively, if a similar request has been previously issued and stored in databases 380, delivery estimation systems 320 may receive the PDD from databases 380. Further, in embodiments where the delivery estimation systems 320 has a back-end calculator and a front-end gateway, the front-end portion of delivery estimation systems 320 may receive the calculated estimated delivery from the back-end portions. Moreover, in step 706 delivery estimation systems 320 may receive information about the delivery address category for specific delivery types. For example, delivery estimation systems 320 may receive information of whether the delivery address is available for dawn delivery, is conditionally available for dawn delivery, or if it is in a category that has no availability for dawn deliveries.

The delivery estimate or PDD received in step 706 may include an expiration time to meet the PDD or the delivery options. Thus, the estimated delivery may include a conditional expiration time that specifies when is the deadline to guarantee the delivery or to have the delivery option. For example, the estimated delivery time may be "Monday 20:00" with an expiration time of "30 min." In this example, the PDD can only be guaranteed to be "Monday 20:00" if the order is received within 30 min. Otherwise, the estimated delivery date has expired and the PDD is no longer valid. Alternatively, or additionally, the available delivery options may include "dawn delivery tomorrow" with an expiration time of "20 min." In such example, the dawn delivery option can only be fulfilled if the order is received within 20 min.

In step 708, delivery estimation systems 320 may generate an electronic message including the estimated delivery date and the delivery options. The electronic message may be formatted specifically for the remote systems that generated the query in step 702. For example, delivery estimation systems 320 may generate an electronic message for client devices 350 when they request the product information. The electronic message may include a TCP/IP message, SMS message, or other similar electronic communications. The electronic message generated in step 708 may include an HTML File or JavaScript with product information and delivery information, as further described in connection to FIG. 16. In some embodiments, the HTML file may include the product information, the delivery date estimate, available delivery options, and instructions to modify the webpage. In such embodiments, the modification instructions may include identifying the webpage's type (the webpage's type being one of a search result page, a single display page, a cart page, or an order page) and modifying the webpage based on the webpage's type.

Moreover, the electronic message of step 708 may specify instructions to generate or modify a webpage in the remote device. In some embodiments, hypermedia elements based on HTML or JavaScript may be configurable to modify webpages instead generating a new one. For example, when a user of client devices 350 is browsing a webpage that displays products, like described in FIG. 1B, the electronic message may include instructions to modify the webpage; instead of sending updated versions of the webpage as estimated deliveries are computed. Such embodiments improve the technical field of generating dynamic webpages by minimizing network congestion.

Furthermore, in embodiments in which the product information is associated with specific delivery options, the electronic message may include instructions to modify the webpage by showing or removing certain products. For example, in step 706 delivery estimation systems 320 may receive information that the product requested is not available for certain delivery options. In such embodiments, the electronic message may include instructions to modify the website and show certain products as no longer available for the delivery option. In such embodiments, the electronic message may also include instructions to show alternative products.

In step 710, delivery estimation systems 320 may transmit the electronic message of step 708 to the remote device. For example, the HTML or JavaScript files generated in step 708 may be transmitted to client devices 350 when client devices 350 request the product information. In embodiments that employ dawn delivery options, delivery estimation systems 320 may perform specific instructions to communicate with users in step 710. For example, when a user of client devices 350 is set to receive a dawn delivery, delivery estimation systems 320 may activate two settings. First, delivery estimation systems 320 may identify products going to be delivered by dawn and issue a promise of dawn delivery, for example delivery by 7 AM. Further, delivery estimation systems 320 may modify graphical user interfaces, as further described in connection with FIG. 15, to indicate the dawn delivery promise. Second, when fulfilling dawn deliveries, estimation system 320 may program a messaging service (such as Google Cloud Messaging (GCM) or Apple Push Notification service (APNs)) to send a push notification at a predefined time to customers. In such embodiments, delivery estimation systems 320 may program push notifications to include delivery info, photos of the delivered package, and/or data associated with delivery. Further, delivery estimation systems 320 may program and generate push/text notifications based on user preferences that can be set during checkout. Moreover, push notifications may also be used to prompt the user to enter additional delivery information to enable certain delivery options. For example, the push notifications may be used to request delivery information from the user, including instructions for delivery.

In step 712, delivery estimation systems 320 may receive an acknowledgement. For example, delivery estimation systems 320 may receive an acknowledgement from client devices 350 that the electronic message was received. Further, based on receiving the acknowledgement, delivery estimation systems 320 may initiate a timer based on the expiration time. With this configuration, delivery estimation systems 320 may save resources on the number of timers that need to be employed to monitor expiration of estimated delivery dates. Instead of immediately starting timers for estimated delivery dates or PDDs, delivery estimation systems 320 may minimize utilization of computational resources by only initiating timers when client devices 350 acknowledge they received and/or displayed the estimated delivery.

In step 714, delivery estimation systems 320 may determine whether an order for a product has been received. For example, delivery estimation systems 320 may review order requests in order data streams to determine if the customer associated with the remote device has completed the order. If delivery estimation systems 320 determine an order has been received (step 714: yes), delivery estimation systems 320 may continue to step 716 and initiate a fulfillment process. Thus, delivery estimation systems 320 may send instructions to a fulfillment center to ship the product or initiate the process to fulfill the order. For example, delivery estimation systems 320 may engage with SAT system 101 to begin processing the order. Further, in step 716 delivery estimation systems 320 may cancel timers associated with the order to release computing resources.

However, if delivery estimation systems 320 determine an order has not been received (step 714: no), delivery estimation systems 320 may continue to step 718. In step 718, delivery estimation systems 320 may determine whether the time for a delivery option has expired. For example, if the delivery estimate received in step 706 was associated with an expiration time of one hour, in step 718 delivery estimation systems 320 may determine whether an hour has lapsed since the delivery estimate was received. If delivery estimation systems 320 determine that the expiration time has not lapsed (step 718: No), delivery estimation systems 320 may return to step 714 and continue monitoring whether an order has been received for the product and cycle between steps 714 and step 718. However, if delivery estimation systems 320 determine the expiration time lapsed (step 718: Yes), delivery estimation systems 320 may continue to step 720 and send a new request for updated delivery estimate. For example, delivery estimation systems 320 may send a request for updated delivery estimates to the fulfillment centers or to a back-end portion of the delivery estimation systems 320.

In some embodiments, requesting an updated PDD or updated delivery options in step 720 may include identifying fulfillment centers based on the remote device information, requesting available inventory from identified fulfillment centers, and selecting a fulfillment center from the identified fulfillment centers based on a match between corresponding available inventory and the product identification.

In step 722, delivery estimation systems 320 may receive updated delivery estimates or options from fulfillment center or back-end calculator portion of the system. For example, because the first delivery or PDD estimate expired, delivery estimation systems 320 may receive an updated delivery estimate or PDD that is later than the first delivery estimate received in step 706. If the initial delivery estimate was "Monday at 20:00" the second delivery estimate may be "Tuesday at 10:00." This second delivery may also include an expiration time.

In some embodiments, steps 720 and 722 may be executed by performing operations of determining the estimate expiration for the first delivery estimate lapsed, providing (to a second system such as FO systems 113) a third request for a second delivery date estimate, receiving (from the second system) the second delivery date estimate, and generating a second electronic message comprising instructions to modify the webpage by substituting the first delivery date estimate with the second delivery date estimate.

In step 724, like in step 712, delivery estimation systems 320 may receive an acknowledgement and initiate a timer based on the new expiration time. Moreover, delivery estimation systems 320 may return to step 714 to monitor the order and delivery date estimates and initiate fulfillment process or request, again, an update for the delivery estimate when the expiration lapses.

Figure 8:
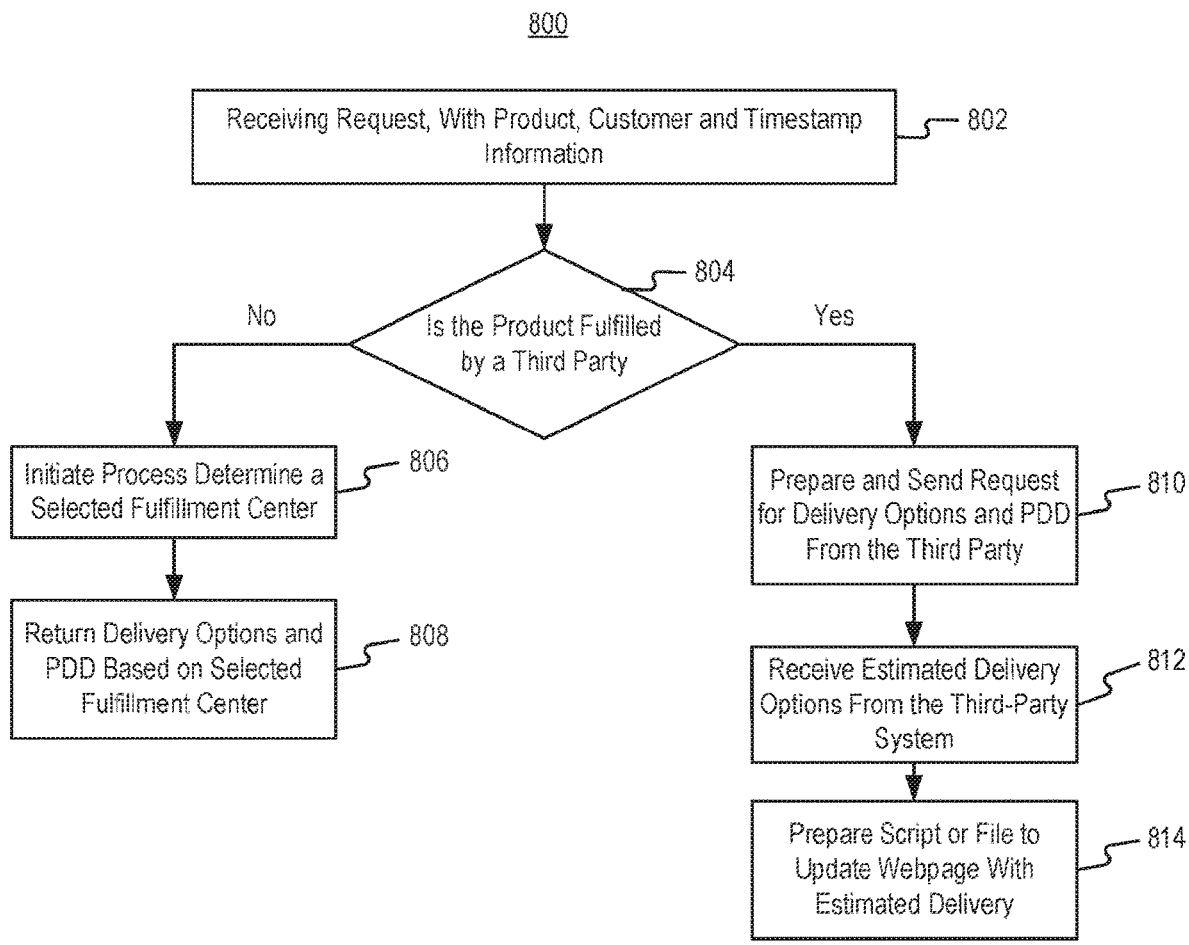
FIG. 8 is a flow chart of an exemplary process for handling estimate requests of products fulfilled by third parties, consistent with disclosed embodiments.

FIG. 8 is a flow chart of an exemplary process 800 for handling estimate requests of products fulfilled by third parties, consistent with disclosed embodiments. In some embodiments, elements of system 300 may perform process 800. For example, as disclosed in the steps description below, delivery estimation systems 320 may perform process 800. Alternatively, or additionally, third-party systems 360 may perform process 800, or parts of process 800. Further, in other embodiments system 100, or parts of system 100, may perform process 800. For instance, FO system 113 and 3PL systems 121 may perform process 800.

In step 802 of process 800, delivery estimation systems 320 may receive a request for product information including product, customer, and timestamp information. For example, delivery estimation systems 320 may receive a request for product information from client devices 350. The request may also include customer information, such as a postal code, delivery address, and a timestamp of when the request was generated.

In step 804, delivery estimation systems 320 may determine whether the product would be fulfilled by a third party. For example, delivery estimation systems 320 may determine the product is unavailable in local inventory and would need to be fulfilled by a third party. Alternatively, or additionally, delivery estimation systems 320 may determine the product is normally fulfilled by third parties by default, without requiring an inventory query.

If delivery estimation systems 320 determine the product is not fulfilled by a third party (step 804: No), delivery estimation systems 320 may continue to step 806 and initiate the process to determine a selected fulfillment center. For example, based on the postal code of the delivery address, product availability, and fulfillment center capacity, delivery estimation systems 320 may identify a fulfillment center that has a priority to complete an order. In step 808, delivery estimation systems 320 may send available delivery options based on the selected fulfillment center. For example, once a fulfillment center is identified in step 806, delivery estimation systems 320 may determine a delivery date estimate and send it to client devices 350 for display to customers.

However, if delivery estimation systems 320 determine the product is fulfilled by a third party (step 804: Yes), delivery estimation systems 320 may continue to step 810 and prepare a request for available delivery options or PDDs from the third party. For example, in step 810 delivery estimation systems 320 may prepare and send a request for available delivery options to third-party systems 360 or 3PL systems 121. The request sent to the third party may include the product information and customer information (e.g., customer's postal code).

In step 812, delivery estimation systems 320 may receive the estimated delivery date or the available delivery options from third parties that may fulfill an order for the product requested in step 802. For instance, delivery estimation systems 320 may receive a PDD and delivery estimate information from one of third-party systems 360.

In step 814, delivery estimation systems 320 may prepare an electronic message including a JavaScript or HTML file to update or generate webpages including the estimated delivery date and/or time. The electronic message may then be submitted to the requester of product information in step 802.

Steps in process 800 may be stored in a memory device of delivery estimation systems 320, which may include instructions to determine, by consulting a database (such as databases 380), whether delivery of the product will be fulfilled by a third party. Delivery estimation systems 320 may also, based on determining that the delivery of the product will be fulfilled by a third party, provide the request for a delivery date estimate, or available delivery options, to a system associated with the third party. Further, based on determining that the delivery of the product will not be fulfilled by a third party, delivery estimation systems 320 may provide the request for a delivery date estimate to a system that pre-stores a plurality of delivery date estimates in memory.

Figure 9:
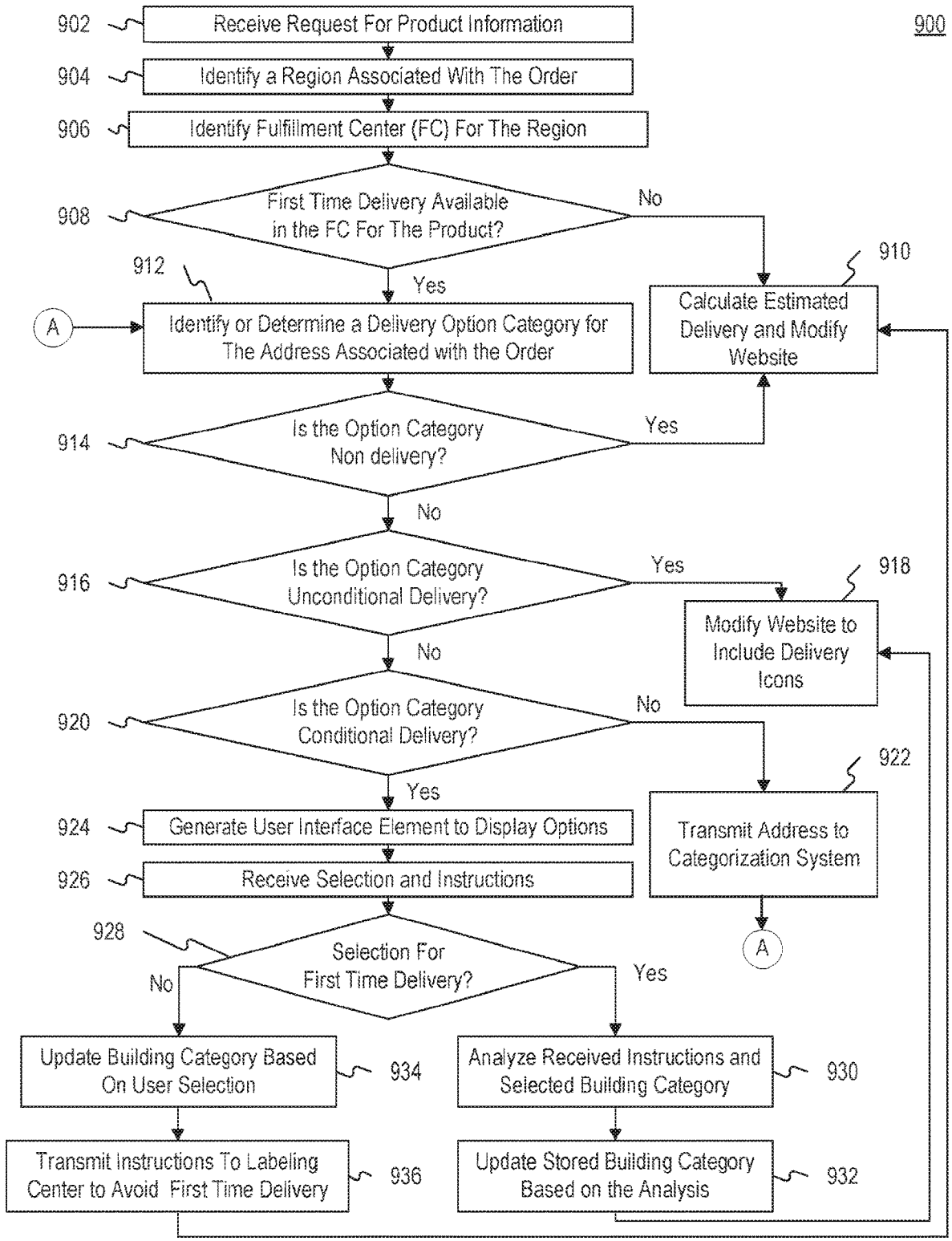
FIG. 9 is a flow chart of a delivery option selection process, consistent with disclosed embodiments

FIG. 9 is a flow chart of a delivery option selection process 900, consistent with disclosed embodiments. In some embodiments, elements of system 300 may perform process 900. For example, as disclosed in the steps description below, delivery estimation systems 320 may perform process 900. This is only an illustrative example of process 900, however, and in other embodiments system 100, or parts of system 100, may perform process 900. For example, FO System 113 and/or FC Auth 123 (FIG. 1A) may perform one or more of the steps in process 900.

In step 902, delivery estimation systems 320 may receive a request for product information. The request may include product, time, and/or delivery address. Based on the information in the request, delivery estimation systems 320 may identify relevant region associated with the order in step 904. For example, delivery estimation systems 320 may identify regions that may fulfill a potential order for the product based on the customer's postal code.

In step 906, delivery estimation systems 320 may identify fulfillment centers that may complete a potential order for the product. In some embodiments, the region identified in step 904 may include multiple fulfillment centers. In such embodiments, delivery estimation systems 320 may filter fulfillment centers based on ability to meet a PDD, availability of the requested product, or availability of delivery options.

In step 908, delivery estimation systems 320 determine whether the identified fulfillment centers of step 908 have first time delivery options available for the product. In some embodiments, delivery estimation systems 320 may have preconfigured selections for the first time delivery options. For instance, delivery estimation systems 320 may specify the first time delivery options as one or more of dawn deliveries (e.g., before 6 AM), night deliveries (e.g., after 8 PM), or midnight deliveries (e.g., at midnight), among others. Thus, first time deliveries may be non-limited and refer to delivery at any preselected time of the day. Alternatively, or additionally, the first time deliveries may be dynamically selected based on availability and selection guidelines that may consider delivery speed, delivery preferences, and costs. Moreover, in step 908 delivery estimation systems 320 may determine whether a selected first time delivery can be met based on a cutoff time. In such embodiments, the cutoff time may be specific each product in the FC and delivery estimation systems 320 may first request cutoff times for the product's first time delivery, compare the order time with the cutoff time, and determine if first time delivery is available for the product in the fulfillment center identified in step 906. Alternatively, or additionally, the FCs may have global cutoff times. In such embodiments, delivery estimation systems 320 may determine whether first time delivery is available for the requested product based on the global cutoff time.

If in step 908 delivery estimation systems 320 determines that first delivery is not available for the product in the selected FC (step 908: No), delivery estimation systems 320 may continue to step 910. In step 910, delivery estimation systems 320 may calculate an estimated delivery and modify a product website. For example, delivery estimation systems may request a PDD determination, as described in connection with FIG. 7, and generate HTML or JavaScript code to modify the product website to include the PDD and/or additional delivery information.

If, however, in step 908 delivery estimation systems 320 determine that first time delivery is available for the product (step 908: Yes), delivery estimation systems 320 may continue to step 912. In step 912, delivery estimation systems 320 may identify or determine a delivery option category for the address associated with the order. For example, delivery estimation systems 320 may retrieve information about the delivery address from a database to determine a category for the delivery address. The retrieved information may specify whether the delivery address has opt-in or opt-out from certain delivery options. Alternatively, or additionally, in step 912 delivery estimation systems 320 may use historic or public record information to determine a delivery option category for the address. For example, if public record information indicates that the delivery address is associated with a university or a public building, delivery estimation systems 320 may categorize the address in a corresponding delivery option category. Further, if historic delivery records show that first time deliveries are unsuccessful in the delivery address, delivery estimation systems 320 may categorize the delivery address in a corresponding group.

In step 914, delivery estimation systems 320 may determine whether the delivery option category is non delivery. Non delivery option category may be for addresses where it is not possible to complete a first time delivery. For example, if in previous occasions it has not been possible to enter a building to deliver after hours, the delivery option category may be non delivery to prevent unsuccessful deliveries. Alternatively, or additionally, the non delivery option category may be assigned to addresses in which users have declined the first time delivery option.

If delivery estimation systems 320 determine that the delivery option category is non delivery (step 914: Yes), delivery estimation systems 320 may continue to step 910 and calculate an estimated delivery time (e.g., a PDD) and generate a script or hypermedia element to modify or generate a product website delivery. However, if delivery option category is not non delivery (step 914: No), delivery estimation systems 320 may continue to step 916.

In step 920, delivery estimation systems 320 may determine whether the delivery option category for first time delivery is unconditional delivery. Unconditional delivery option category may be for addresses where it is possible to complete a first time delivery and no further information is required from the user. For example, conditional delivery option may be assigned to addresses where the user has selected first time delivery and provided the required information to complete a first time delivery. Alternatively, or additionally, the unconditional delivery option category may be assigned to addresses in which users have selected to automatically opt-in for first time delivery, in addresses that operate 24 hours, and/or in addresses that have systems for automated package receipt.

If delivery estimation systems 320 determine that the delivery option category is unconditional delivery (step 916: Yes), delivery estimation systems 320 may continue to step 918. In step 918, delivery estimation systems 320 may generate a HTML file, JavaScript, or general hypermedia element, to modify or generate a website to include icons and/or interactive elements that indicate first time delivery is available for the requested product. However, if delivery option category is not unconditional delivery (step 916: No), delivery estimation systems 320 may continue to step 920.

In step 916, delivery estimation systems 320 may determine whether the delivery option category for first time delivery is conditional delivery. Conditional delivery option category may be for addresses where it is possible to complete a first time delivery but requires additional information from the user or specific user approval. For example, conditional delivery option may require the user to provide specific instructions to enter a building or to leave a package. Alternatively, or additionally, the conditional delivery option category may be assigned to addresses in which users have selected to manually opt-in or opt-out from first time delivery.

If delivery estimation systems 320 determine that the delivery option category is not conditional delivery (step 920: No), delivery estimation systems 320 may infer that the categorization process of the address was unsuccessful and continue to step 922. In step 922, delivery estimation systems 320 may transmit the address to a categorization system that may analyze historic, user, and public record information to categorize the building. For example, in step 922 delivery estimation systems 320 may request a categorization process as further described in connection to FIG. 12. In some embodiments, after step 922, delivery estimation systems 320 may return to step 912 and identify again a delivery option category for the address associated with the order. Thus, delivery estimation systems 320 may attempt to recategorize the address in one of the viable categories for website modification. In some embodiments, however, after step 922 delivery estimation systems 320 may not return to step 912 and do not modify the website when the address is not associated with any of the categories. However, if delivery estimation systems 320 determines the delivery option category is conditional delivery (step 920: yes), delivery estimation systems 320 may continue to step 924.

In step 924, delivery estimation systems 320 may generate a user interface element to display options and/or instructions for the user. For example, in step 924, delivery estimation systems 320 may generate a hypermedia element that allows users to select receiving the requested product at first time. Further, the user interface element may display input elements, such as text boxes, radio buttons, or sliders, to capture user information. For instance, in step 924 estimation delivery systems 320 may generate JavaScripts to generate a pop up window on the website that request instructions from a user to complete a first time delivery. Moreover, the user interface element may include an input field for providing instructions to enable entry to the destination address. In such embodiments the user interface element may include an input text box and include interactive hypermedia elements and/or a pop up window configured to be displayed over the website.

In step 926, delivery estimation systems 320 may receive selection and instructions from the client device. The instructions may include instructions for first time delivery or instructions to not deliver at a first time and to deliver with a different option (such as deliveries with standard PDD, a next-day delivery, a two-day delivery, or a ground delivery). The selections may include opt-in or opt-out options for delivery at first time.

In step 928, based on the information captured in step 926, delivery estimation systems 320 may determine if there was a selection for first time delivery. If delivery estimation systems 320 determines that there was a selection for first time delivery (step 928: Yes), delivery estimation systems 320 may continue to step 930 and analyze the received instructions and select a building category. For example, delivery estimation system 320 may determine whether the instructions are sufficient using machine-learning methods to verify enough information was provided to, for example, enter a building after hours. Further, in step 928 delivery estimation systems 320 may determine whether the order time falls in a weekend or holiday and retrieve information specific for weekend delivery from the first database information.

Based on information analyzed or collected in step 930, delivery estimation systems 320 may update a database to include the updated categorization for the building, based on the analysis, in step 932. Delivery estimation systems 320 may also continue to step 918 and generate instructions to modify or generate product websites to include delivery icons.

If in step 928, delivery estimation systems 320 determine that the selection received in step 926 was not for first time delivery (step 928: No), delivery estimation systems 320 may continue to step 934 and update the building category based on the user selection. For example, if the user selected to opt-out from first time delivery, delivery estimation systems 320 may update the address category to non delivery option. Moreover, in step 934 delivery estimate systems 320 may modify a third database to associate the destination address with a second restriction that specify user preferences to not have first time deliveries. Further, in step 936 delivery estimation systems 320 may transmit instructions to labeling centers to avoid first time delivery. For example, to prevent a package from leaving for first time delivery, delivery estimation systems 320 may transmit instructions to modify shipping labels to include messages or rerouting instructions to avoid first time delivery.

Moreover, once it is determined the user opted-out from first time delivery, delivery estimation systems 320 may also continue to step 910 to calculate an estimated delivery or PDD that is not first time delivery and generate instructions to modify the product website to, for example, display the PDD and expiration time.

Figure 10:
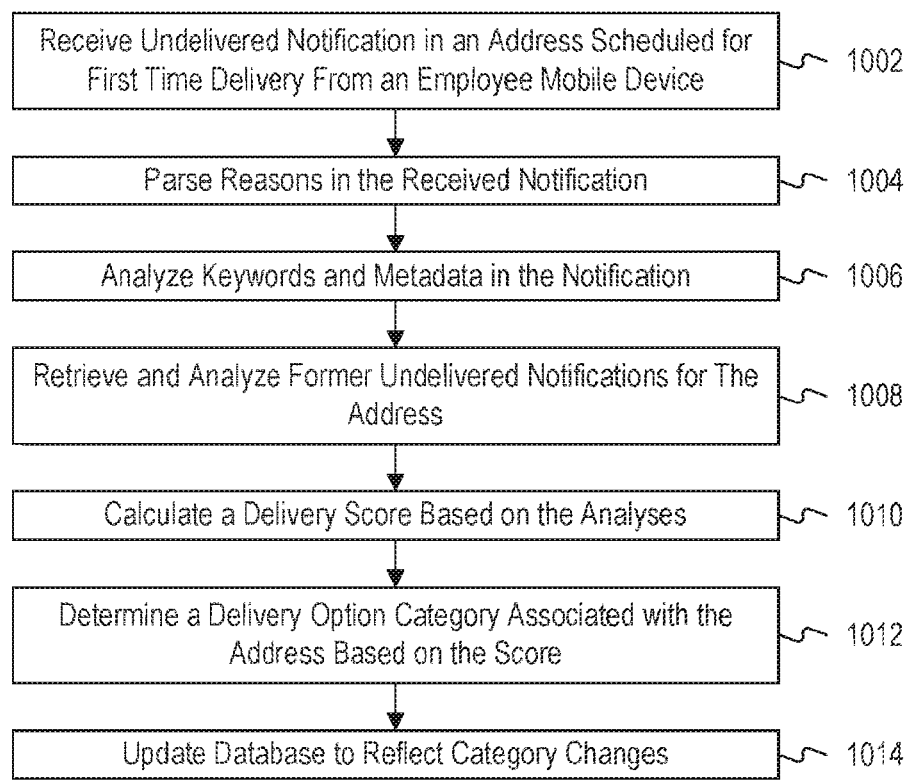
FIG. 10 is a process flow diagram of an exemplary address non-delivery categorization process, consistent with disclosed embodiments.

FIG. 10 is a process flow diagram of an exemplary address non-delivery categorization process 1000, consistent with disclosed embodiments. In some embodiments, elements of system 300 may perform process 1000. For example, as disclosed in the steps description below, delivery estimation systems 320 may perform process 1000. In other embodiments, however, parts of system 100, may perform process 1000. For example, FO System 113 and/or FC Auth 123 (FIG. 1A) may perform one or more of the steps in process 1000.

Process 1000 may allow system 300, or system 100, to determine addresses where certain delivery options should be unavailable. For example, through process 1000 delivery estimation systems 320 may determine that first time deliveries are not possible for a specific address because a building cannot be accessed after hours. Alternatively, or additionally, process 1000 may allow delivery estimation systems 320 to determine dawn deliveries are not possible in a specific address. Further, process 1000 may allow estimation systems 320 to determine addresses where fresh deliveries rare not possible due to environmental conditions.

In step 1002, delivery estimation systems 320 may receive an undelivered notification associated with an address scheduled for first time delivery. The undelivered notification may be received from an employee mobile device. For example, when a package courier is not able to deliver a package at a first time, a mobile device associated with the package courier may transmit the undelivered notification. The undelivered notification may include a time stamp, delivery address information, product information, and attempted delivery option, such as fresh delivery or dawn delivery. Further the undelivered notification may include reasons for non-delivery, such as "Building not accessible" or "Unsafe conditions." Alternatively, or additionally, the reasons for non-delivery may include voice notes and/or images. To facilitate receiving detailed reasons for allowance, delivery estimation systems 320 may allow package couriers to provide voice notes with the reasons for non-delivery.

In step 1004, delivery estimation systems 320 may parse reasons received with the notification. For example, delivery estimation systems 320 may analyze text files to identify reasons for non-delivery. Delivery estimation systems 320 may employ techniques such as parsing based limiting character. Alternatively, or additionally, delivery estimation systems 320 may employ natural language recognition techniques to identify sentences in the reasons for non-delivery to discretize reasons for non-delivery. In embodiments in which the reasons for non-delivery are not provided in text, in step 1004 delivery estimation systems 320 may convert the file into text for further analysis. For instance, delivery estimation systems 320 may use voice to text conversion to generate a text file based on the voice recording. Further, in embodiments in which the reasons for non-delivery are provided in images or video, in step 1004 delivery estimation systems 320 may use image recognition techniques to correlate the images with reasons for non-delivery. For instance, if the reasons for non-delivery include an image of a locked door with a numeric keyboard, delivery estimation systems 320 may correlate the image with a "no password for entry," reason for non-delivery.

In step 1006, delivery estimation systems 320 may analyze keywords and metadata in the notification. With the objective to characterize the reasons for non-delivery, in step 1006 estimation systems 320 may identify keywords in the reasons for non-delivery. For example, delivery estimation systems 320 may search for keywords such as "access," "outdoor," or "concierge," among others in the reasons for allowance. Moreover, in step 1006 delivery estimation systems 320 may analyze the metadata to identify the reasons for non-delivery. For instance, delivery estimation systems 320 may use the metadata of text, voice, or images files to categorize the reasons for non-delivery.

In step 1008, delivery estimation systems 320 may retrieve and analyze former undelivered notifications for the address. For example, delivery estimation systems 320 may query databases of non-delivery records and identify if the same address has a history of non-delivery or denied packages.

In step 1010, delivery estimation systems 320 may calculate a delivery score based on the analyses. For example, based on the analysis of key words in reasons for allowance, delivery estimation systems 320 may assign a delivery score. If the reasons for allowance includes "no access is possible after hours" and the same delivery address is associated with former unsuccessful deliveries, delivery estimation systems 320 may assign a low delivery score. However, if the reasons for allowance includes "temporary inaccessibility to building" and the same delivery address is associated with former successful deliveries, delivery estimation systems 320 may assign a high delivery score.

In step 1012, delivery estimation systems 320 may determine a delivery option category associated with the address based on the score. For example, if the address received a score below a deliverability threshold, delivery estimation systems 320 may determine that the address should be categorized in a "non-delivery option" because this address has strong reasons for non-delivery or a history of unsuccessful delivery. If, however, the address received a score above a consistent delivery threshold, delivery estimation systems 320 may determine that the address should be categorized in an "unconditioned delivery option" because this address has a history of successful deliveries. Moreover, for scores that are between thresholds and there is no clear outcome of delivery methods, delivery estimation systems 320 may categorize the delivery address as a "conditional delivery option," requiring further information from the user for certain delivery options and/or limiting de delivery options to only some days or times.

In step 1014, delivery estimation systems 320 may update a database to reflect category changes. For example, based on the determinations of step 1012, delivery estimation systems 320 may update databases storing the categorization for optional deliveries. For instance, in step 1012 delivery estimation systems 320 may update databases 380 (FIG. 3) to indicate the updated delivery category for an address and/or create a new database entry for the analyzed delivery address. For example, based on feedback received from an employee in step 1002, delivery estimation systems 320 may modify a database, such as a third database storing restrictions for delivery, to associate the destination address with the first restriction.

Figure 11:
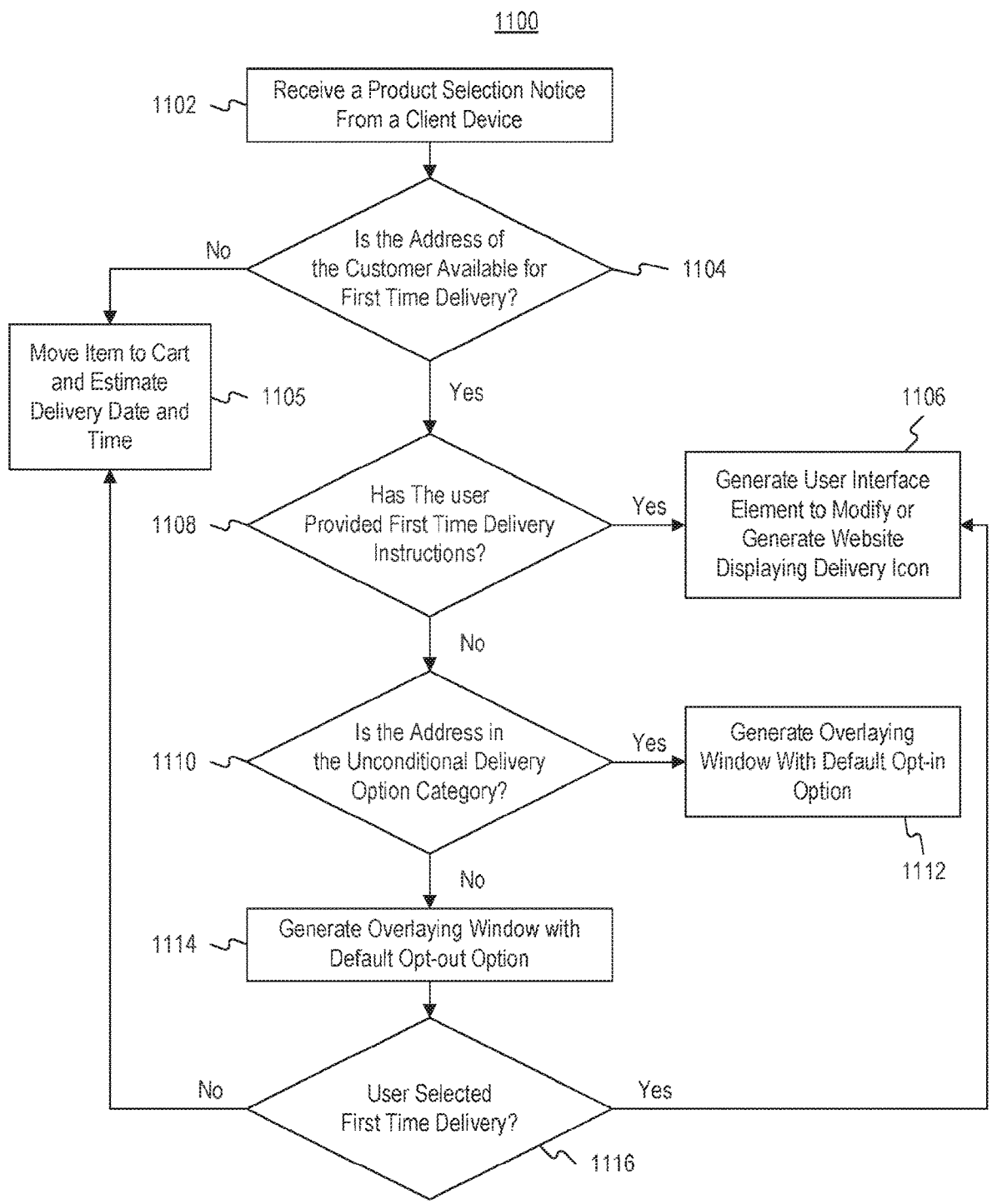
FIG. 11 is a process flow diagram of an exemplary website modification process, consistent with disclosed embodiments.

FIG. 11 is a process flow diagram of an exemplary website modification process 1100, consistent with disclosed embodiments. In some embodiments, elements of system 300 may perform process 1100. For example, as disclosed in the steps description below, delivery estimation systems 320 may perform process 1100. This is only an illustrative example of process 1100, however, and in other embodiments system 100, or parts of system 100, may perform process 1000. For example, FO System 113 and/or FC Auth 123 (FIG. 1A) may perform one or more of the steps in process 1100.

In step 1102, delivery estimation systems 320 may receive a product selection notice from a client device. For example, when users select products displayed in an online retailer website, client devices 350 may send product selection notices to delivery estimation systems 320. The product selection notices may include product information, time stamps, location of the client, potential delivery address, and potential delivery zone or region.

In step 1102, delivery estimation systems 320 may determine whether the address of the customer is available for first time delivery. The first time delivery options may have been preset as delivery option at dawn, night, or any other selected time of the day. For example, delivery estimation systems 320 may identify a delivery option category assigned to the delivery address by querying a memory device or a database. If delivery estimation systems 320 determines the address of the customer is not available for first time delivery (Step 1104: No), delivery estimation system 320 may continue to step 1105 and move item to cart. In such embodiments, in step 1105 delivery estimation systems 320 may generate instructions to modify a selected product website, like the one described in connection with FIG. 1D. Further, delivery estimation systems 320 may estimate delivery date and time using, for example, a PDD identification as further described in connection with FIG. 7. Moreover, in some embodiments delivery estimation systems 320 may, based on determining that the destination address is not eligible for delivery of products by the first time, generate a user interface element with an indication against delivery by the first time.

However, if delivery estimation systems 320 determines the address of the customer is available for first time delivery (Step 1104: Yes), delivery estimation system 320 may continue to step 1108. In step 1108, delivery estimation systems 320 may determine whether the user provided first time delivery instructions. For example, delivery estimation systems 320 may determine whether a database includes instructions for first time delivery, such as codes for the building, or instructions to contact a concierge. Further, delivery estimation systems 320 may determine whether the instructions are complete by, for example, determining a relatedness of the instructions with similar buildings or buildings in the same zone.

If delivery estimation systems 320 determines the user provided first time delivery instructions (Step 1108: Yes), delivery estimation system 320 may continue to step 1106 and generate user interface element to modify or generate website displaying delivery icon. For example, in step 1106 delivery estimation systems 320 may generate an HTML or JavaScript file that modifies the selected product website to include icons that indicate the first time delivery is available. Alternatively, or additionally, delivery estimation systems 320 may generate a website that includes the product information and icons or interactive elements indicating the available delivery options.

If, however, delivery estimation systems 320 determines the user did not provide first time delivery instructions (Step 1108: No), delivery estimation system 320 may continue to step 1110. In step 1110, delivery estimation systems 320 may determine whether the address is in the unconditional delivery option category. For instance, delivery estimation systems 320 may retrieve records associated with the address to determine whether the address has been categorized in the unconditional delivery category. This may occur when, for example, delivery estimation systems 320 identifies recent records of successful first time deliveries.

If delivery estimation systems 320 determines the address is in the unconditional delivery option category (Step 1110: Yes), delivery estimation system 320 may continue to step 1112 and generate overlaying window with default opt-in option. For example, after a user selects a product, delivery estimation system 320 may generate a pop up window on the website that provides a message for a user explaining that first time deliveries are available for the product. Further, delivery estimation system 320 may also include interactive elements to allow users to opt-in or opt-out from the first time delivery. However, if the delivery address has been determined to be in the unconditional delivery option, the interactive elements may be set by default for opt-in.

If, however, delivery estimation systems 320 determines the address is not in the unconditional delivery option category (Step 1110: No), delivery estimation system 320 may continue to step 1114. In step 1114, delivery estimation system 320 may generate one or more overlaying window with default opt-out option. For example, similar to the window generated for step 1112, delivery estimation systems 320 may generate a pop up window that explains to a user of the website that first time delivery option is available. Like the pop up window of step 1112, the pop up window of step 1114 may include interactive elements for capture user response and messages with information. However, unlike the pop up window of step 1112, the interactive elements may be defaulted to opt-out selections. For instance, when the delivery address is in the "conditional delivery category," the interactive elements may be defaulted to opt-out selections to require the user to affirmatively select the type of delivery and request additional information, if needed. Moreover, in some embodiments, delivery estimation systems 320 may, based on determining that a third database storing delivery restrictions contains the destination address, generate the user interface element comprising a non-selectable element disallowing future deliveries by the first time.

In step 1116, delivery estimation systems 320 may determine whether the user selected first time delivery. For example, delivery estimation systems 320 may determine whether in response to the options displayed in steps 1112 or 1114, the user selected first time delivery. If delivery estimation systems 320 determines the user selected first time delivery (step 1116: Yes), delivery estimation system 320 may continue to step 1106 and generate user interface element to modify or generate website displaying delivery icon. If, however, delivery estimation systems 320 determines the user did not select first time delivery (Step 1116: No), delivery estimation system 320 may continue to step 1105 and move the item to the cart for future purchase.

Further, in step 1105 delivery estimation system 320 may estimate delivery date and time using, for example, process 700 (FIG. 7).

Figure 12:
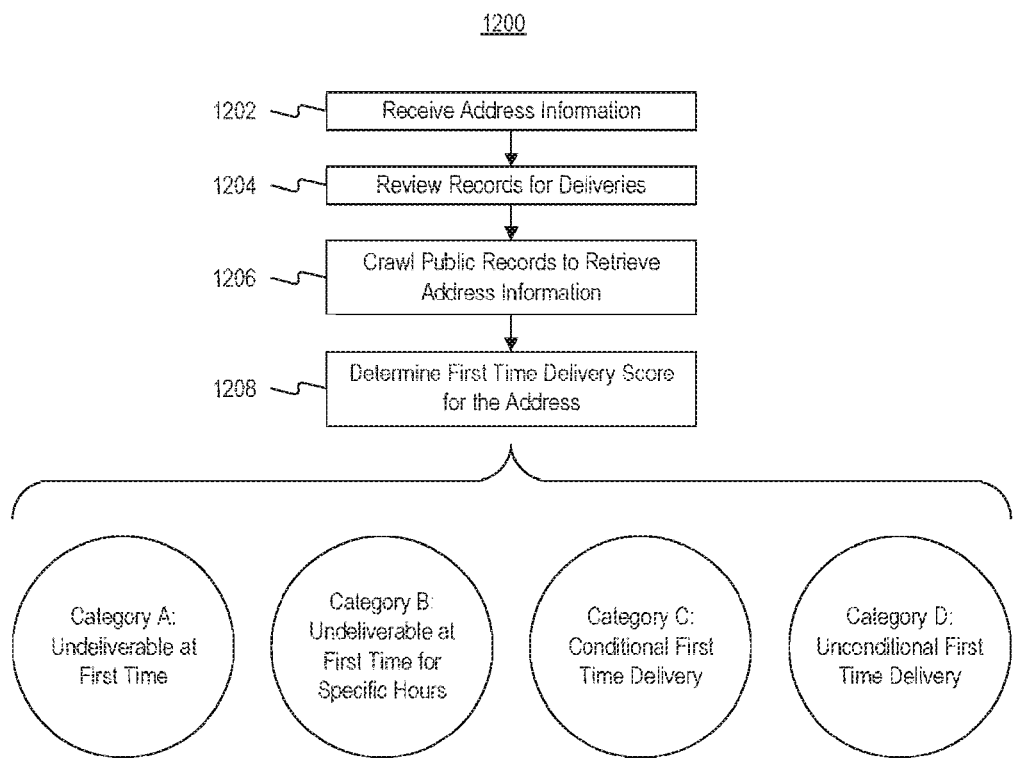
FIG. 12 is a process flow diagram of an exemplary address general categorization process, consistent with disclosed embodiments.

FIG. 12 is a process flow diagram of an exemplary address general categorization process 1200, consistent with disclosed embodiments. In some embodiments, elements of system 300 may perform process 1200. For example, as disclosed in the steps description below, delivery estimation systems 320 may perform process 1200. In other embodiments, however, system 100 or parts of system 100, may perform process 1200. For example, FO System 113 and/or FC Auth 123 (FIG. 1A) may perform one or more of the steps in process 1200.

Process 1200 may allow system 300 to categorize addresses for available delivery options, even if a user has not provided instructions or preferences. For example, even if the user has not provided instructions for first time delivery, which may include dawn deliveries, delivery estimation system 320 may employ process 1200 to determine which category should be assigned to the target delivery address.

In step 1202, delivery estimation systems 320 may receive address information. For example, delivery estimation systems 320 may receive a street address of a venue or a home. In step 1204, delivery estimation systems 320 review records for deliveries for the address. Delivery estimation systems 320 may review the history of deliveries in the address, including the type of delivery, date and time of delivery, and any notifications received from employee mobile devices.

In step 1206, delivery estimation systems 320 may analyze and/or crawl public records to retrieve address information. For example, delivery estimation systems 320 may query public records associated with the address. The public records may include tax or property records that provide information about the address. Further, in step 1206 delivery estimation systems 320 may search advertising websites to determine if the address is associated with a commercial venue, a public building (like a university), or an office building. Moreover, in step 1206 delivery estimation systems 320 may crawl websites that are related to the delivery address to determine certain features, such as the availability of a concierge.

In step 1208, delivery estimation systems 320 may determine first time delivery score for the address. For example, based on the historic delivery records associated with the address, the information retrieved from public records, and/or privately held records for the address, delivery estimation systems 320 may determine a first time delivery score for the address. The score may be low if the likelihood of successful first time delivery is low. But the score may be high if the likelihood of successful first time delivery is high.

For example, the first time delivery score may be an accumulation variable that increases as first time deliveries are successful for the address but decreases any time there is an unsuccessful delivery in the address. Thus, as more first time deliveries are successful in the address, the accumulation variable increases indicating a greater likelihood of successful first time delivery. Instead, if the accumulation variable is low, the accumulation variable may indicate a low first time delivery score because it is unlikely the first time delivery will be successful. Further, in some embodiments the accumulation variable may be modified, for example with a multiplier, based on the information that is retrieved from public records. For example, if public records indicate that the address is associated with a building with a concierge, the accumulation variable may be modified with a multiplier greater than one to indicate a greater likelihood of successful delivery. However, if the public records indicate that the address is associated with a public building, like a university, the accumulation variable may be modified with a multiplier that is less than one. Alternative implementations or processes may be used for the determination of first time delivery score for the address in step 1208.

As shown in FIG. 12, based on the first time delivery score determination, delivery estimation systems 320 may categorize the address in, for example, one of: (i) Category A: Undeliverable at First Time; (ii) Category B:Undeliverable at First Time for Specific Hour; (iii) Category C: Conditional First Time Delivery; and (iv) Category D: Unconditional First Time Delivery. However, these four are just examples of categories and delivery estimation systems 320 may use different categorization based on the first time delivery score. For example, delivery estimation systems 320 may categorize the address only in two groups, delivery or non delivery. Alternatively, delivery estimation systems 320 may categorize the address in more than four groups including greater levels of granularization that specify when and what types of deliveries are permitted for the delivery address.

Figure 13:
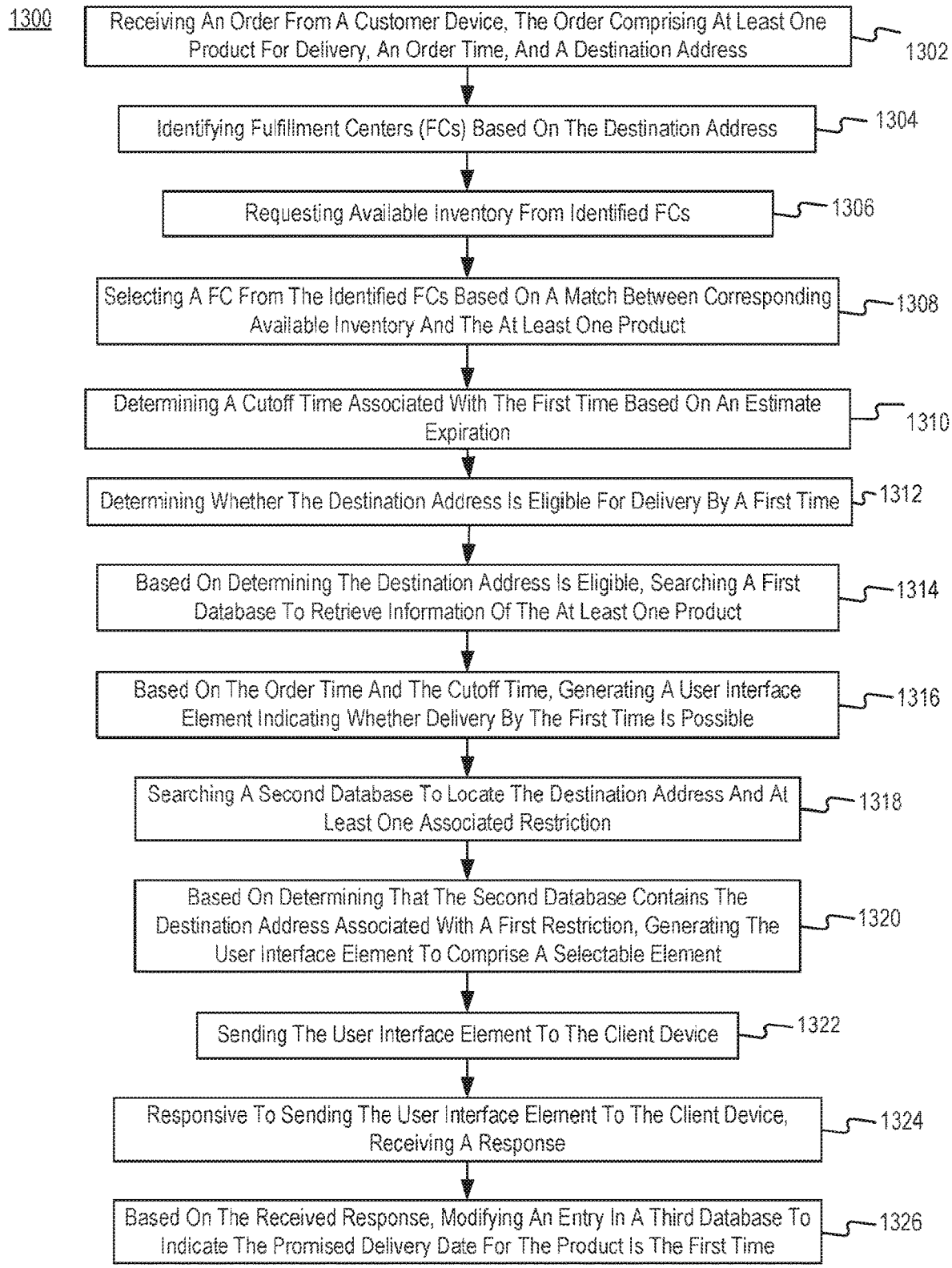
FIG. 13 is a process flow diagram of an exemplary first time delivery categorization process, consistent with disclosed embodiments.

FIG. 13 is a process flow diagram of an exemplary first time delivery categorization process 1300, consistent with disclosed embodiments. In some embodiments, elements of system 300 may perform process 1300. For example, as disclosed in the steps description below, delivery estimation systems 320 may perform process 1300. This is only an illustrative example of process 1300, however, and in other embodiments system 100, or parts of system 100, may perform process 1300. For example, FO System 113 and/or FC Auth 123 (FIG. 1A) may perform one or more of the steps in process 1300.

In step 1302, delivery estimation systems 320 may receive an order from a customer device. The order may include at least one product for delivery, an order time, and a destination address. The order may be sent as a TCP/IP packet with a payload that includes information about the product, order, and client.

In step 1304, delivery estimation systems 320 may identify one or more fulfillment centers (FCs) based on the destination address. For example, using a threshold distance from the client, delivery estimation systems 320 may identify FCs that are close to the client and should be favored to fulfill a potential order from the client device.

In step 1306, delivery estimation systems 320 may request available inventory from identified FCs. For example, once FCs are identified, delivery estimation systems 320 may request a table or a file that specifies the products available in the FC. In step 1308, delivery estimation systems 320 may select an FC from the identified FCs based on a match between corresponding available inventory and the at least one product. For instance, delivery estimation systems 320 may select an FC if the FC has the requested product available in inventory.

In step 1310, delivery estimation systems 320 may determine a cutoff time associated with the first time based on an estimated expiration. For example, delivery estimation systems 320 may determine a cutoff time for first time delivery at 7 PM, if delivery estimation systems 320 estimates that orders placed after 7 PM cannot be delivered at first time. In step 1312, delivery estimation systems 320 may determine whether the destination address is eligible for delivery by a first time. For instance, delivery estimation system 320 may query a database that categorizes each address to determine whether the destination address is eligible for first time delivery.

In step 1314, delivery estimation systems 320 may search a first database to retrieve information of the at least one product based on determining the destination address is eligible. For example, delivery estimation systems 320 may search a database associated with the FC to retrieve product information, including their price, available quantity, characteristics, and/or reviews and comments. In step 1316, delivery estimation systems 320 may generate a user interface element indicating whether delivery by the first time is possible based on the order time and the cutoff time. For example, if the order time is within the cutoff time, delivery estimation systems 320 may generate an interactive icon that indicates the delivery at first time is possible, as further described in connection to FIG. 15.

In step 1318, delivery estimation systems 320 may search a second database to locate the destination address and associated restrictions. For example, delivery estimation systems 320 may search a second database that includes delivery address information to determine specific restrictions for the address. In such embodiments, delivery estimation systems 320 may query a database to see if there are records that restrict first time deliveries to the delivery address. Example restrictions may include a required access code, specific delivery instructions, or a limited time window for first time deliveries.

In step 1320, delivery estimation systems 320 may generate a user interface element to comprise a selectable element. Based on determining that the second database contains the destination address associated with a first restriction, delivery estimation systems 320 may generate a graphical user interface, such as a pop up window or a hypermedia element, the includes a selectable element to capture user feedback for the first time delivery. In step 1322, delivery estimation systems 320 may send the user interface element to the client device.

In step 1324, delivery estimation systems 320 may receive a response from the client device. For instance, responsive to sending the user interface element to the client device, delivery estimation system 320 may receive a user response specifying delivery information or user delivery option selection. In step 1326, delivery estimation systems 320 may update a database and modifying an entry in a third database to indicate the promised delivery date for the product is the first time based on the received response. For example, if the user provides a selection for no first time delivery, delivery estimation systems 320 may update databases 380 to indicate there should be no first time delivery for that address. In such embodiments, delivery estimation system 320 may also update labeling instructions to prevent future first time deliveries. If, however, the user provides a response specifying first time delivery and including satisfactory instructions to complete first time delivery, delivery estimation systems 320 may update databases 380 to indicate deliveries should default to first time delivery if available.

Figure 14:
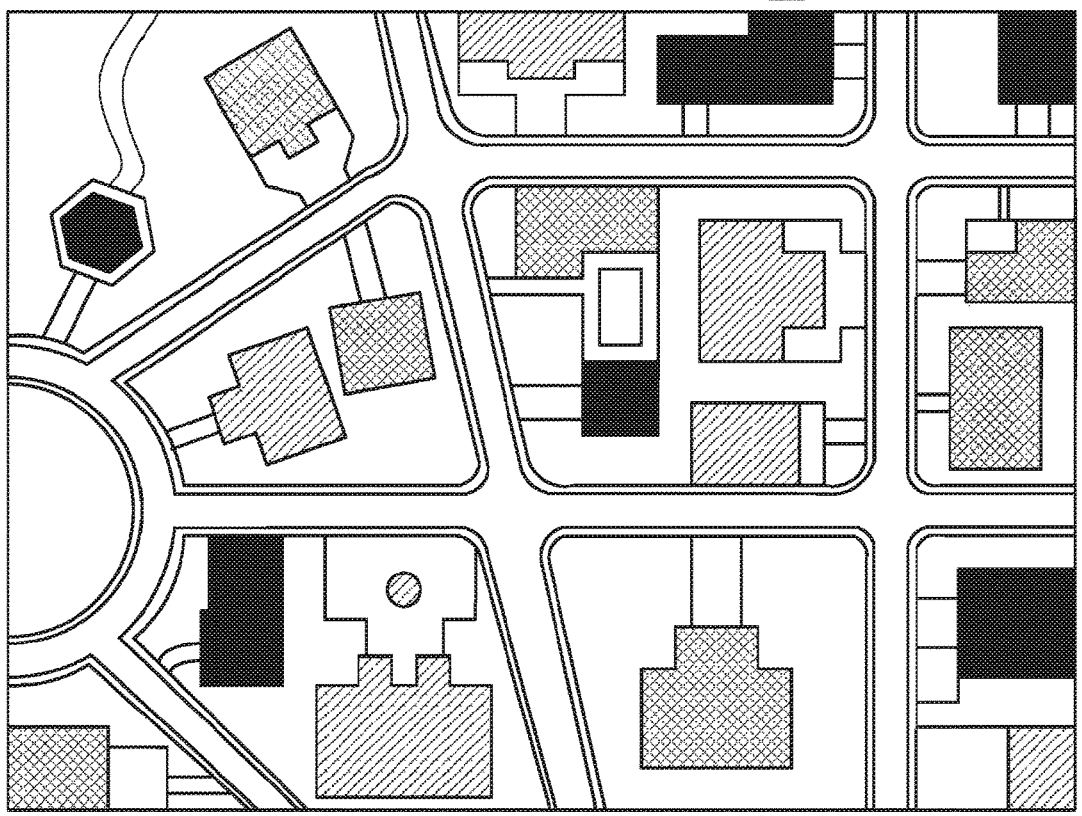
FIG. 14 is a graphic representation of a delivery region with categorized buildings, consistent with disclosed embodiments.

FIG. 14 is a graphic representation 1400 of a delivery region with categorized buildings, consistent with disclosed embodiments. FIG. 14 shows a top-view of a delivery region with multiple buildings. Each building in the region may be in a delivery category, which may be determined with, for example, process 1200 (FIG. 12).

As shown in FIG. 14, each building in the delivery region may have a specific delivery category. This delivery category may specify which delivery options are available for the building. For example, the delivery categories may specify whether the building is eligible for first time deliveries, which in some embodiments may include dawn deliveries. Alternatively, or additionally, the delivery categories may specify whether the buildings are eligible for fresh deliveries.

In some embodiments, as shown in FIG. 14, the buildings may be categorized in one of three categories. For example, buildings may be categorized in one of "Non Delivery Category," "Conditional Delivery Category," or "Unconditional Delivery Category." In other embodiments, however, the building categorization may include different, more, or less categories. For example, as described in connection with FIG. 12, there may be four delivery categories. Alternately, the categorization may be binary, placing the buildings in simply "Non Delivery" and "Auto Delivery" categories. Further, while FIG. 14 shows categories that are mutually exclusive, in some embodiments the categorization may include inclusive categories, having each building being associated with multiple categories.

Information displayed in graphic representation 1400 may be stored in a database that correlates addresses of buildings with their respective category. As further described in connection with FIG. 9, such database with category information may be used by system 300, or portions of system 300, to generate hypermedia elements and modify websites to display icons or interactive windows to capture information. This level of more detailed segregation that permits further specificity than only postal codes or general zones, may facilitate work flows for fulfilling online orders and allow greater level of personalization of online retail websites.

Figure 15:
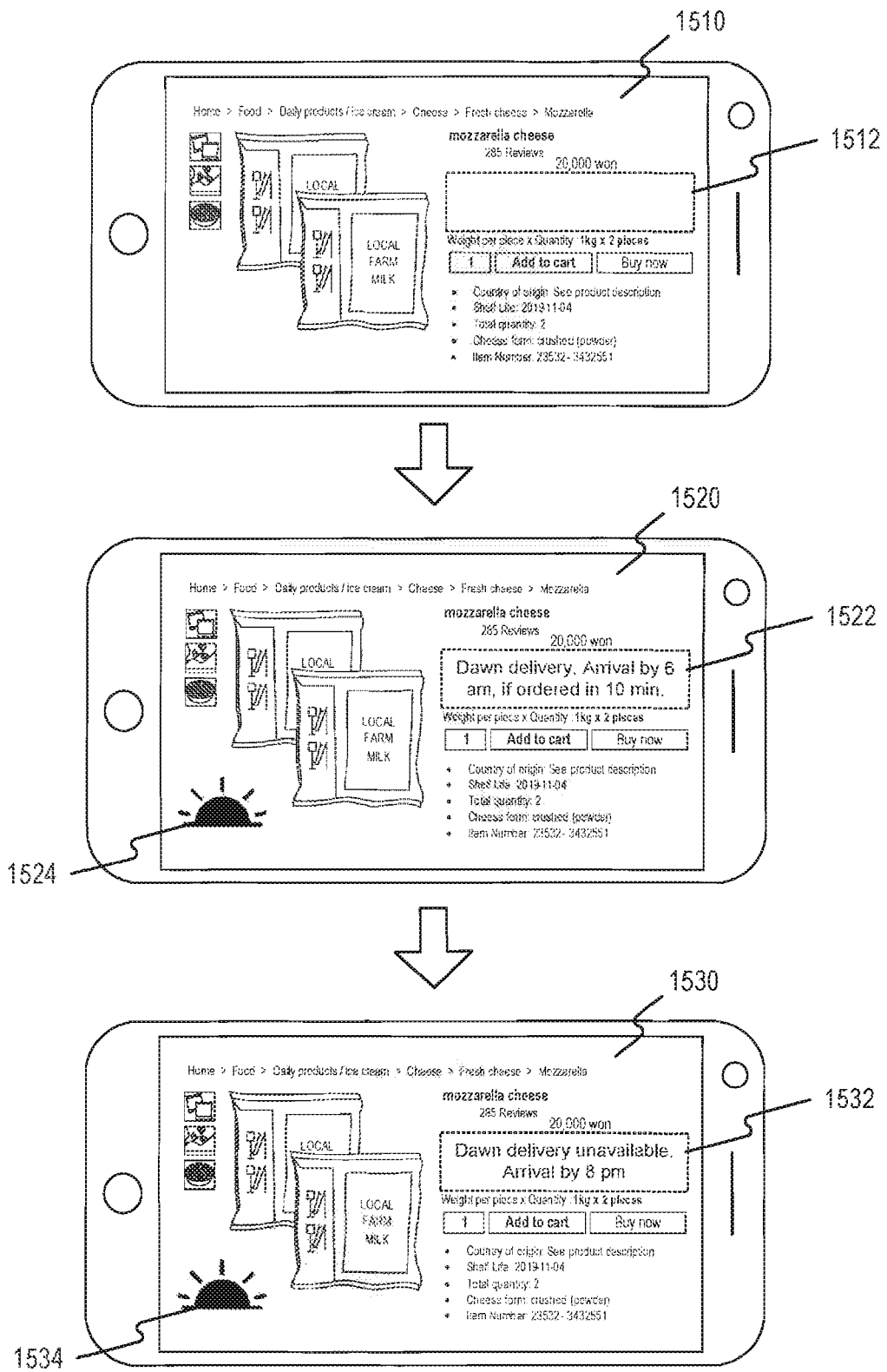
FIG. 15 is a front view of a sequence of Single Display Page exemplary graphical user interfaces in a mobile device, consistent with disclosed embodiments.

FIG. 15 is a front view of a sequence of Single Display Page exemplary graphical user interfaces in a mobile device, consistent with disclosed embodiments. FIG. 15 shows three graphical user interfaces (GUIs) that may be displayed in client devices 350 and/or user devices 102.

GUI 1510 shows a single product with a graphical description, text description, order information, and a dynamic text box. The dynamic textbox 1512 in GUI 1510 is empty. In some embodiments, dynamic textbox 1512 may be empty awaiting for calculations by delivery estimation systems 320.

GUI 1520 shows the same single product information but dynamic textbox 1512 has been substituted by dynamic text box 1522, which now specifies delivery options, estimated delivery date, and expiration, displaying "Dawn delivery, Arrival by 6 am, if ordered in 10 min." In some embodiments, electronic messages generated by delivery estimation systems 320 may include instructions to update dynamic textbox 1512 to dynamic textbox 1522. Moreover, in GUI 1520 the product display may be modified to include additional icons to indicate available delivery service. For example, the product displayed in GUI 1520 may be updated to show a first time delivery icon 1524, to show the product is available for dawn delivery based on cutoff and proximity to fulfillment centers. In some embodiments, first time delivery icon 1524 may include information specific to the product or the tentative delivery date/time. For example, first time delivery icon 1524 may include a message such as "before dinner," based on determinations from delivery estimation systems 320.

GUI 1530 shows the single product information but dynamic text box 1522 has been updated to dynamic textbox 1532. For example, the expiration time of 10 min may have lapsed from GUI 1520 to GUI 1530. Thus, delivery estimation systems 320 may have sent instructions to update the delivery estimate from 1 pm to 8 pm. Moreover, GUI 1530 may also show first time delivery icon 1534 displayed on products that can be delivered by dawn next day.

FIG. 16 is an exemplary source code of a script configurable to generate or modify a webpage with delivery date estimates and/or available delivery options. Exemplary source code 1600 shows exemplary instructions and functions that may be employed to generate or modify a webpage to display available delivery options and estimated delivery times, as described in connection with FIGS. 9 and 11. For example, electronic messages generated and transmitted by delivery estimation systems 320 may include exemplary source code 1600. The syntax and instructions used in exemplary source code 1600 is exemplary and different syntaxis and functions can be also employed and/or substituted.

Exemplary source code 1600 may include headers 1601 including the html headers to identify and/or modify a webpage. Headers 1601 are only examples of operations and headers that could be used. Exemplary source code 1600 may also include a document type identification portion 1602. Portion 1602 may include functions to evaluate whether a webpage is a cart page, order page, search page, or single product page. The functions detailed in portion 1602 are only exemplary functions.

Exemplary source code 1600 may also include a dynamic textbox generation portion 1604. Functions and routines in portion 1604 may specify the messages and modification instructions, as discussed in connection to FIGS. 9 and 11. Further, exemplary source code 1600 may include a modification portion 1606 including options for modifications of the different webpages. Moreover, exemplary source code 1600 may include a timer portion 1608, which may include instructions to display a timer on the webpage that is correlated with expiration times, or remaining times, of the estimated delivery times for products.

Routines in portion 1604, modification portion 1606, and timer portion 1608 is only an exemplary implementations and different or alternative implementations are possible.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

What is claimed is:

1. A computer implemented system for generating customized webpages, the system comprising:
at least one non-transitory computer-readable medium configured to store instructions; and
at least one processor configured to execute the instructions to perform operations comprising:
receiving a request to display a webpage from a client device;
retrieving address data associated with the client device from a database;
calculating a delivery score for the address data based at least on historic delivery records;
assigning the address data to one of four pre-defined categories based on the delivery score, the pre-defined categories comprising a non-delivery category, a non-first time delivery in specific hours category, a conditional first time delivery category, and an unconditional first time delivery category, the conditional first time delivery category being assigned to addresses requiring additional information from the client device or specific user approval for first time delivery;

generating instructions for displaying an overlaying window in the client device when the delivery category group is the conditional first time delivery category, the instructions comprising a modification portion comprising options for modification of webpages and a timer portion comprising instructions to display a timer correlated with an expiration time, the overlaying window comprising:
one or more interactive elements to capture delivery instructions and the timer, the one or more interactive elements comprising a selectable element for first time deliveries displayed with a default opt-out option;
a message requesting input of instructions to complete a first time delivery option; and
one or more input text boxes;
updating the database based on a user input received in the one or more interactive elements and the one or more input boxes; and
after updating the database in response to the user input, generating instructions to modify the webpage to include a first time delivery icon, the first time delivery icon comprising a tentative delivery time.

2. The computer implemented system of claim 1, wherein the delivery score is further based on public records.

3. The computer implemented system of claim 2, wherein the operations further comprise:
modifying the webpage to include a hypermedia element indicating first time delivery is available when the delivery category group is the unconditional first time delivery category.

4. The computer implemented system of claim 2, wherein the operations further comprise:
determining whether a user selected an opt-out option through the one or more interactive elements; and
updating the database by assigning the address data to the no first time delivery category when the user has selected the opt-out option.

5. The computer implemented system of claim 1, wherein:
the database is a first database; and
assigning the address data to the one of four pre-defined categories comprises searching a second database to locate the address data and an associated first time delivery restriction, the first time delivery restriction comprising at least one of an access code, delivery instructions, or limited time window for deliveries.

6. The computer implemented system of claim 1, wherein:
first time deliveries comprise before 6 AM deliveries; and
the one or more interactive elements comprise an input field for providing instructions allowing before dawn deliveries.

7. The computer implemented system of claim 1, wherein the operations further comprise:
determining whether the user input enables first time deliveries, using machine-learning methods that verify whether enough information was provided for entering a building.

8. The computer implemented system of claim 1, wherein the overlaying window comprises a pop up window configured to be displayed over the webpage, the pop up window comprising a message describing first time delivery availability and selectable elements with default opt-out options.

9. The computer implemented system of claim 1, wherein calculating the delivery score comprises:
retrieving, from the database, historic undelivered notifications associated with the address data.

10. The system of claim 1, wherein the instructions further comprise a routines portion specifying webpage modification instructions.

11. A computer implemented method for generating customized webpages, the method comprising:
receiving a request to display a webpage from a client device;
retrieving address data associated with the client device from a database;
calculating a delivery score for the address data based at least on historic delivery records;
assigning the address data to one of four pre-defined categories based on the delivery score, the pre-defined categories comprising a non-delivery category, a non-first time delivery in specific hours category, a conditional first time delivery category, and an unconditional first time delivery category, the conditional first time delivery category being assigned to addresses requiring additional information from the client device or specific user approval for first time delivery;
generating instructions for displaying an overlaying window in the client device when the delivery category group is the conditional first time delivery category, the instructions comprising a modification portion comprising options for modification of webpages and a timer portion comprising instructions to display a timer correlated with an expiration time, the overlaying window comprising:
one or more interactive elements to capture delivery instructions and the timer, the one or more interactive elements comprising a selectable element for first time deliveries displayed with a default opt-out option;
a message requesting input of instructions to complete a first time delivery option; and
one or more input text boxes;
updating the database based on a user input received in the one or more interactive elements and the one or more input boxes; and
after updating the database in response to the user input, generating instructions to modify the webpage to include a first time delivery icon, the first time delivery icon comprising a tentative delivery time.

12. The computer implemented method of claim 11, wherein the delivery score is further based on public records.

13. The computer implemented method of claim 12, wherein the method further comprises:
modifying the webpage to include a hypermedia element indicating first time delivery is available when the delivery category group is the unconditional first time delivery category.

14. The computer implemented method of claim 12, further comprising:
determining whether a user selected an opt-out option through the one or more interactive elements; and
updating the database by assigning the address data to the no first time delivery category when the user has selected the opt-out option.

15. The computer implemented method of claim 11, wherein:
the database is a first database; and assigning the address data to the one of four pre-defined categories comprises searching a second database to locate the address data and an associated first time delivery restriction, the first time delivery restriction comprising at least one of an access code, delivery instructions, or limited time window for deliveries.

16. The computer implemented method of claim 11, wherein:
first time deliveries comprise before 6 AM deliveries; and
the one or more interactive elements comprise an input field for providing instructions allowing before dawn deliveries.

17. The computer implemented method of claim 11, wherein
the method further comprises determining whether the user input enables first time deliveries, using machine-learning methods that verify enough information was provided for entering a building; and
the overlaying window comprises a pop up window configured to be displayed over the webpage, the pop up window comprising a message describing first time delivery availability and selectable elements with default opt-out options.

18. The computer implemented method of claim 11, wherein calculating the delivery score comprises:
Retrieving, from the database, historic undelivered notifications associated with the address data.

19. The method of claim 11, wherein the instructions further comprise a routines portion specifying webpage modification instructions.

20. A system comprising:
one or more databases storing before dawn delivery restrictions associated with client addresses, the before dawn delivery restrictions comprising at least one of an access code, delivery instructions, or limited time window for deliveries;
one or more processors coupled to the one or more databases; and
one or more memory devices coupled to the one or more processors, the one or more memory devices storing instructions that configure the one or more processors to:
receive a request to display a webpage from a client device;
retrieve address data associated with the client device from the one or more databases;
calculate a delivery score for the address data based at least on historic delivery records;
assign the address data to one of four pre-defined categories based on the delivery score, the pre-defined categories consisting of: a no before 6 AM delivery category, a conditional before 6 AM delivery category, and an unconditional before 6 AM delivery category, the conditional before 6 AM delivery category being assigned to addresses requiring additional information from the client device or specific user approval for before 6 AM delivery;
generate instructions for displaying a pop up window in the client device when the delivery category group is the conditional before 6 AM delivery category, the instructions comprising a modification portion comprising options for modification of webpages and a timer portion comprising instructions to display a timer correlated with an expiration time, the pop up window comprising a message describing before 6 AM delivery availability, a message requesting input to complete a before 6 AM delivery option, one or more input boxes, and displaying one or more interactive elements to capture delivery instructions and the timer, the one or more interactive elements comprising a selectable element for before 6 AM deliveries displayed with a default opt-out option;
update the one or more databases based on user input in the one or more interactive elements an the one or more input boxes; and
after updating the database in response to user input, generating instructions to modify the webpage to include a before 6 AM delivery icon.

* * * * *

UNITED STATES PATENT AND TRADEMARK OFFICE
CERTIFICATE OF CORRECTION

PATENT NO. : 11,449,571 B2
APPLICATION NO. : 16/932086
DATED : September 20, 2022
INVENTOR(S) : Erik Rehn It is certified that error appears in the above-identified patent and that said Letters Patent is hereby corrected as shown below:

In the Claims

In Claim 18, Column 43, Lines 26-27, "delivery score comprises: Retrieving," should read --delivery score comprises: retrieving,--.

In Claim 20, Column 44, Line 35, "elements an the one" should read --elements and the one--.

Signed and Sealed this
Fifteenth Day of November, 2022

Katherine Kelly Vidal
*Director of the United States Patent and Trademark Office*